US012770205B1

(12) United States Patent
Cohen

(10) Patent No.: US 12,770,205 B1
(45) Date of Patent: Oct. 20, 2026

(54) SYSTEM, METHOD AND APPARATUS FOR INCENTIVIZING INTERGENERATIONAL PRAYERS AND OTHER GRAVESITE RECITATIONS FOR A DECEASED USING FUNDS OF THE DECEASED

(71) Applicant: Yotam Cohen, Traverse City, MI (US)

(72) Inventor: Yotam Cohen, Traverse City, MI (US)

(*) Notice: Subject to any disclaimer, the term of this patent is extended or adjusted under 35 U.S.C. 154(b) by 0 days.

(21) Appl. No.: 19/328,591

(22) Filed: Sep. 15, 2025

(51) Int. Cl.
*G06Q 50/18* (2012.01)
*G06Q 20/18* (2012.01)

(52) U.S. Cl.
CPC ........... *G06Q 50/186* (2013.01); *G06Q 20/18* (2013.01)

(58) Field of Classification Search
CPC ............................. G06Q 50/186; G06Q 20/18
See application file for complete search history.

(56) References Cited

U.S. PATENT DOCUMENTS 5,663,547 A * 9/1997 Ziarno ................... G06Q 20/04 902/4
5,665,952 A * 9/1997 Ziarno ...................... G07F 7/08 705/329
5,696,366 A * 12/1997 Ziarno ................. G06Q 20/343 705/40
5,887,273 A * 3/1999 Ziarno ................ G07F 17/0014 709/212
7,426,483 B1 * 9/2008 Dorward ................ G06Q 30/02 705/26.8
10,346,806 B2 7/2019 Rosenshein et al.
(Continued)

FOREIGN PATENT DOCUMENTS

CA 3019551 A1 * 10/2016
CN 108222642 A 6/2018
(Continued)

OTHER PUBLICATIONS

Allison, F., Nansen, B., Gibbs, M., Arnold, M., Holleran, S., & Kohn, T. (2024). Reimagining memorial spaces through digital technologies: A typology of CemTech. Death Studies, 48(8), 790-800. https://doi.org/10.1080/07481187.2023.2276308 (Year: 2024 ).*

(Continued)

*Primary Examiner* — Ashford S Hayles
(74) *Attorney, Agent, or Firm* — Shlomo Horowitz; Shlomo Horowitz Patents and Intellectual Property Ltd.

(57) ABSTRACT

A gravesite payout apparatus located at a gravesite for enhancing a memory of a deceased, includes a gravesite object on the ground of the gravesite or on another gravesite object that rests on a ground or on a floor offset from the ground, and a payment module that conditions its payment on recitation by the client at the gravesite, which may comprise an ATM machine including a computer with memory storing payout rules consistent with instructions of the deceased and a digital interface to notify that a payment was made or issue a confirmation of payment. A system may further include an application on a mobile phone, a remote computer with a database of particular recitations required by the deceased for particular clients. The system may verify the location of the client (i.e. by verifying the client's capture of content on the monument) and the client's performance of the recitation.

22 Claims, 31 Drawing Sheets

(56) References Cited

U.S. PATENT DOCUMENTS

| | | | | |
|---|---|---|---|---|
| 11,959,296 | B2 * | 4/2024 | Schechter | E04H 13/001 |
| 2002/0116230 | A1 * | 8/2002 | Sheem | G06Q 40/08 705/4 |
| 2002/0142275 | A1 * | 10/2002 | Wexler | A44C 23/00 434/246 |
| 2003/0177067 | A1 * | 9/2003 | Cowell | G06Q 30/02 705/14.15 |
| 2005/0026120 | A1 * | 2/2005 | Delvecchio | G09B 19/00 434/236 |
| 2005/0154706 | A1 * | 7/2005 | Notargiacomo | G06Q 10/10 |
| 2011/0282724 | A1 * | 11/2011 | Hwang | G06Q 30/0217 705/14.19 |
| 2014/0328495 | A1 * | 11/2014 | Ivry | H04R 1/028 381/87 |
| 2014/0337059 | A1 | 11/2014 | Simon | |
| 2015/0294394 | A1 * | 10/2015 | Shreve | G06Q 30/0635 705/26.81 |
| 2016/0212076 | A1 * | 7/2016 | Bellissimo | G06Q 50/00 |
| 2016/0364999 | A1 * | 12/2016 | Khadir | A47G 33/00 |
| 2017/0041584 | A1 * | 2/2017 | Jones | H04N 5/76 |
| 2018/0218624 | A1 * | 8/2018 | Osseiran | G09B 5/06 |
| 2018/0227735 | A1 * | 8/2018 | Gold | G06Q 30/02 |
| 2020/0311252 | A1 * | 10/2020 | Huziak | G06Q 10/107 |
| 2021/0211608 | A1 * | 7/2021 | Greenberg | H04N 23/69 |
| 2022/0114686 | A1 * | 4/2022 | Yip | G06Q 30/016 |
| 2022/0307284 | A1 * | 9/2022 | Schechter | E04H 13/001 |
| 2023/0023031 | A1 * | 1/2023 | Muckenfuss | G06F 16/9566 |
| 2023/0274287 | A1 * | 8/2023 | Blaikie, III | H04L 9/3239 705/50 |
| 2024/0028852 | A1 * | 1/2024 | Blackshear | G06K 19/06159 |
| 2024/0104610 | A1 * | 3/2024 | Brody | G06Q 20/18 |
| 2025/0036708 | A1 * | 1/2025 | King | G06F 16/44 |
| 2025/0231998 | A1 * | 7/2025 | Labrecque | H04L 63/08 |

FOREIGN PATENT DOCUMENTS

| | | | | | |
|---|---|---|---|---|---|
| CN | 111383630 | A | * | 7/2020 | G06Q 50/205 |
| CN | 211478935 | U | * | 9/2020 | G05B 19/054 |
| CN | 113822746 | | | 12/2021 | |
| CN | 114461067 | B | * | 1/2025 | H04W 4/80 |
| CN | 20640289 | | | 9/2025 | |
| JP | 2002157356 | A | * | 5/2002 | |
| JP | 3375323 | B2 | | 2/2003 | |
| JP | 2005216036 | A | * | 8/2005 | |
| JP | 2006338628 | A | * | 12/2006 | |
| JP | 2020021122 | A | * | 2/2020 | |
| KR | 20130110348 | A | * | 10/2013 | G06Q 50/10 |
| KR | 20190033000 | A | * | 3/2019 | G06Q 20/387 |
| KR | 20200103955 | A | * | 9/2020 | G06Q 50/10 |
| KR | 102192271 | B1 | * | 12/2020 | G06Q 50/186 |
| KR | 102394131 | B1 | * | 5/2022 | G06Q 30/02 |
| KR | 20220149126 | A | * | 11/2022 | G06Q 50/10 |
| KR | 20230005008 | A | * | 1/2023 | G06K 19/06037 |
| KR | 20230135503 | A | * | 9/2023 | G06Q 50/10 |
| KR | 102873127 | B1 | * | 10/2025 | G06K 19/06037 |
| WO | WO-2009108882 | A1 | * | 9/2009 | G06Q 10/109 |
| WO | WO-2024224032 | A1 | * | 10/2024 | A61B 5/6826 |

OTHER PUBLICATIONS

Rychalski, A., Baudier, P., & Elommal, N. (2025). Digging up the acceptance factors of QR codes on graves. Behaviour & Information Technology, 44(14), 3538-3558. https://doi.org/10.1080/0144929X.2025.2490664 (Year: 2025).*

* cited by examiner

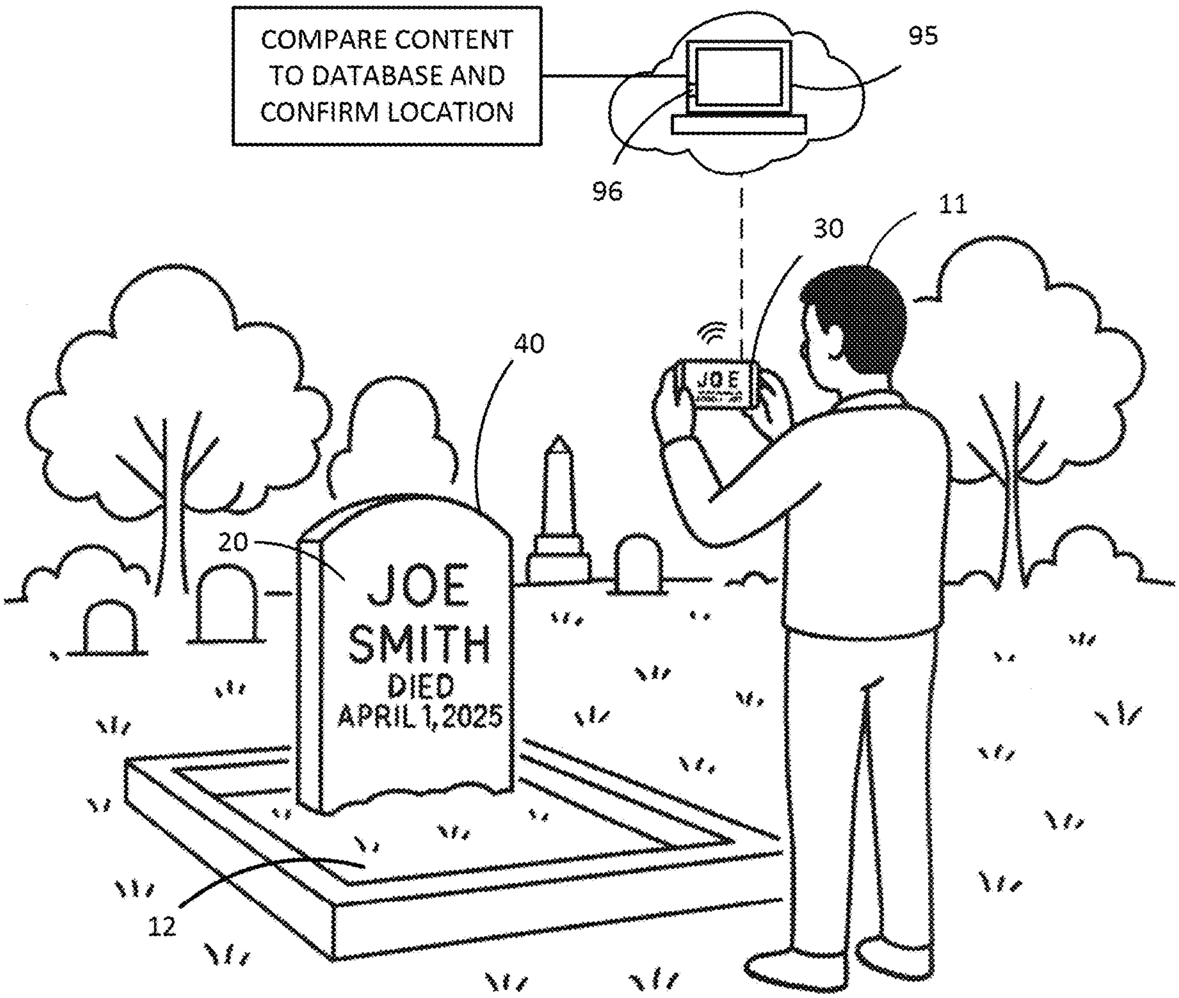
FIG. 3
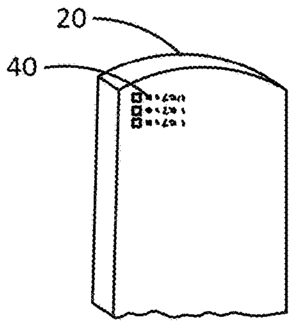
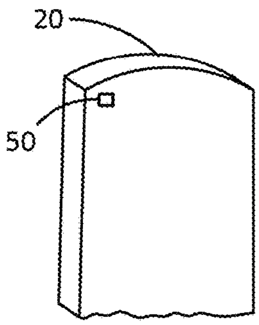
FIG. 4A
FIG. 4B

FIG. 9
80
20
86
11
60
82
Thank you.
Press here
for your
Payment
RECEIPT
JOE SMITH
DIED
APRIL 1, 2025
85
12

FIG. 10
80
20
11
82
60
Thank you.
Please take
Your
payment
89
88
JOE SMITH
DIED
APRIL 1, 2025
12

FIG. 15
400
480
420
11
482
60
Thank you.
Please take
Your
payment
489
488
JOE SMITH
DIED
APRIL 1, 2025
12

SYSTEM, METHOD AND APPARATUS FOR INCENTIVIZING INTERGENERATIONAL PRAYERS AND OTHER GRAVESITE RECITATIONS FOR A DECEASED USING FUNDS OF THE DECEASED

FIELD OF THE INVENTION

The invention is in the field of incentivizing soul-elevating recitations performed at a deceased's grave when a person visits the grave and, in particular, involves payments to the one performing the recitation from a fund set up by the deceased after the recitation is verified. Besides the positive spiritual effect on the deceased, this has the effect of strengthening the memory of the deceased and establishing closer family and other relationships.

BACKGROUND OF THE INVENTION

The deceased are generally unable to perform good deeds directly in this world. They may rely on their relatives, students and/or followers to do so. When this happens their soul may well receive a reward.

There is also a well-known problem that the deceased wish to be remembered, especially by those they touched and loved, such as their family and relatives. In fact they wish that their names be remembered for the good. The problem is that memories fade. In addition, if they committed errors in their relationships for example with their family members (who are the people most likely to be diligent in maintaining and advancing their memory), they cannot directly undo such mistakes. Moreover, the deceased cannot directly strengthen relationships with the living, and certainly not with those who were not even born by the time they left this world. Furthermore, the deceased want their names to be remembered for good, not just to be remembered. Yet they cannot control what people do after they are no longer alive.

Of course, there are memorials that are created for the deceased. But not every deceased receives one. Some people do not even have close family relatives, or do not have those that want to honor their memory. Or they have such relatives but the effort required to set up a memorial is too ambitious for the relatives to do and/or does not result in the practical implementation of this wish. People may want the family to continue to come to the grave and praise and bless the name of the deceased but when their immediate family members themselves are deceased or when their immediate family members are old, this wish does not get implemented. In addition, memorials of various kinds are typically selected by the relatives of the deceased and not by the deceased themselves.

SUMMARY OF THE EMBODIMENTS

One embodiment is a gravesite payout apparatus located at a gravesite for enhancing a memory of a deceased buried at the gravesite, comprising

- a gravesite object resting (i) on a ground of the gravesite, (ii) on a second gravesite object that rests on a ground of the gravesite or that rests on a floor offset from the ground of the gravesite or (iii) on the floor offset from the ground of the gravesite, or a mobile gravesite object held by a user; and
- a payment module, including a computer system, integrally attached to, embedded into or situated on or within the gravesite object, wherein the computer system includes a digital interface and a processing unit configured to control the digital interface such that payments, voucher payments and confirmation of payments are output in accordance with a set of payout rules consistent with a set of instructions of the deceased, the digital interface configured to:
  - notify a user that a payment was made to the user, or
  - issue a payment or a confirmation of payment or a payment voucher to the user.

In some embodiments, issuing the payment comprises transmitting an instruction to either a financial institution or a payment conduit to effectuate the payment.

In some embodiments, the digital interface has a cover and is covered in a first position and is uncovered in a second position. In some embodiments, the cover, in the first position, has an appearance of a candle or a flame.

In some embodiments, the gravesite object or the mobile gravesite object comprises a computer, a tablet computer, a laptop computer, a desktop computer, an e-reader, a mobile smartphone, a smart-TV or a smartwatch located at the gravesite. In some embodiments, the gravesite object or mobile gravesite object is configured to, or configurable to, verify that, or receive a communication that, a recitation has been performed by the user at the gravesite. In some embodiments, the computer, the tablet computer, the laptop computer, the desktop computer, the e-reader, the mobile smartphone, the smart-TV or the smartwatch located at the gravesite is also configured to generate a recording of a recitation performed by the user.

In some embodiments, the computer system is configured to issue the payment or notify the user that the payment was made or issue the payment voucher, once the gravesite payout apparatus has been able to verify that, or a receives a communication of a fact that, a recitation has been performed by the user at the gravesite.

In some embodiments, the gravesite object comprises one or more of: a monument, a seat, a table, a pole embedded into a ground of the gravesite, a holder embedded into a ground of the gravesite, a station, a base, a terminal, a kiosk.

In some embodiments, the gravesite object is a monument.

In some embodiments, the apparatus further comprises an application stored on one or more of the computer, the tablet computer, the laptop computer, the desktop computer, the e-reader, the mobile smartphone, the smart-TV or the smartwatch.

In some embodiments, the apparatus further comprises a camera.

In some embodiments, the instructions determine how to distribute portions of a fund to particular persons or particular persons who fall into particular categories of persons, in exchange for the particular person's recitation at the gravesite.

In some embodiments, the computer system is configured to instruct the digital interface to dispense cash.

Another embodiment is a gravesite payout apparatus for enhancing a memory of a deceased buried at the gravesite, comprising

- a gravesite object, or a mobile gravesite object held by a user, having a payment module, including a computer system configured to notify the user (i) that a payment was or is being made to the user or (ii) to issue a payment or a confirmation of payment or a payment voucher to the user,
- wherein the computer system includes a digital interface and a processing unit configured to control the digital interface such that payments, voucher payments and confirmation of payments are output in accordance with a set of payout rules consistent with a set of instructions of the deceased, the processing unit including a memory that stores the set of payout rules.

In some embodiments, the digital interface has a movable cover such that the digital interface is covered in a first position and is uncovered in a second position. IN some embodiments, a cover of the payment module in the first position has an appearance of a candle or a flame.

In some embodiments, the gravesite object or the mobile gravesite object comprises a computer, a tablet computer, a laptop computer, a desktop computer, an e-reader, a mobile smartphone, a smart-TV or a smartwatch located at the gravesite. In some embodiments, the computer, tablet computer, laptop computer, desktop computer, e-reader, mobile smartphone, smart-TV or smartwatch is configured to, or is configurable to, verify that, or receive a communication that, a recitation has been performed by the user at the gravesite. In some embodiments, the computer, the tablet computer, the laptop computer, the desktop computer, the e-reader, the mobile smartphone, the smart-TV or the smartwatch is separate from or separable from both the gravesite object and the payment module.

In some embodiments, the gravesite object or the mobile gravesite object is configured to generate a recording of a recitation performed by the user.

In some embodiments, the payment module is configured to issue the payment or the payment voucher or notify the user that the payment was made, on condition that the gravesite payment apparatus either has been able to verify that, or has received a communication of a fact that, a recitation has been performed by the user at the gravesite.

In some embodiments, the gravesite object comprises one or more of: a monument, a bench, a chair, a table, a post, a holder embedded into a ground of the gravesite.

In some embodiments, the gravesite object is a monument.

In some embodiments, the apparatus further comprises an application stored on one or more of the computer, the tablet computer, the laptop computer, the desktop computer, the e-reader, the mobile smartphone, the smart-TV or the smartwatch.

In some embodiments, the apparatus further comprises a camera.

In some embodiments, the set of instructions determine how to distribute portions of a fund to particular persons or particular persons who fall into particular categories of persons, in exchange for the particular person's recitation at the gravesite.

In some embodiments, the payment module is configured to dispense cash.

BRIEF DESCRIPTION OF THE DRAWINGS

Various embodiments are herein described, by way of example only, with reference to the accompanying drawings, wherein:

FIG. 3 is a schematic illustration showing the client scanning content on the monument and sending it to a remote computer for comparison so as to verify the client's location, in accordance with one embodiment;

FIG. 4A is a schematic or a rear side of the monument of FIG. 1 in which a QR code is embedded so as to verify location, in accordance with one embodiment;

FIG. 4B is a schematic or a rear side of the monument of FIG. 1 in which a microchip is embedded so as to verify location, in accordance with one embodiment;

DETAILED DESCRIPTION OF THE EMBODIMENTS

Figure 1:
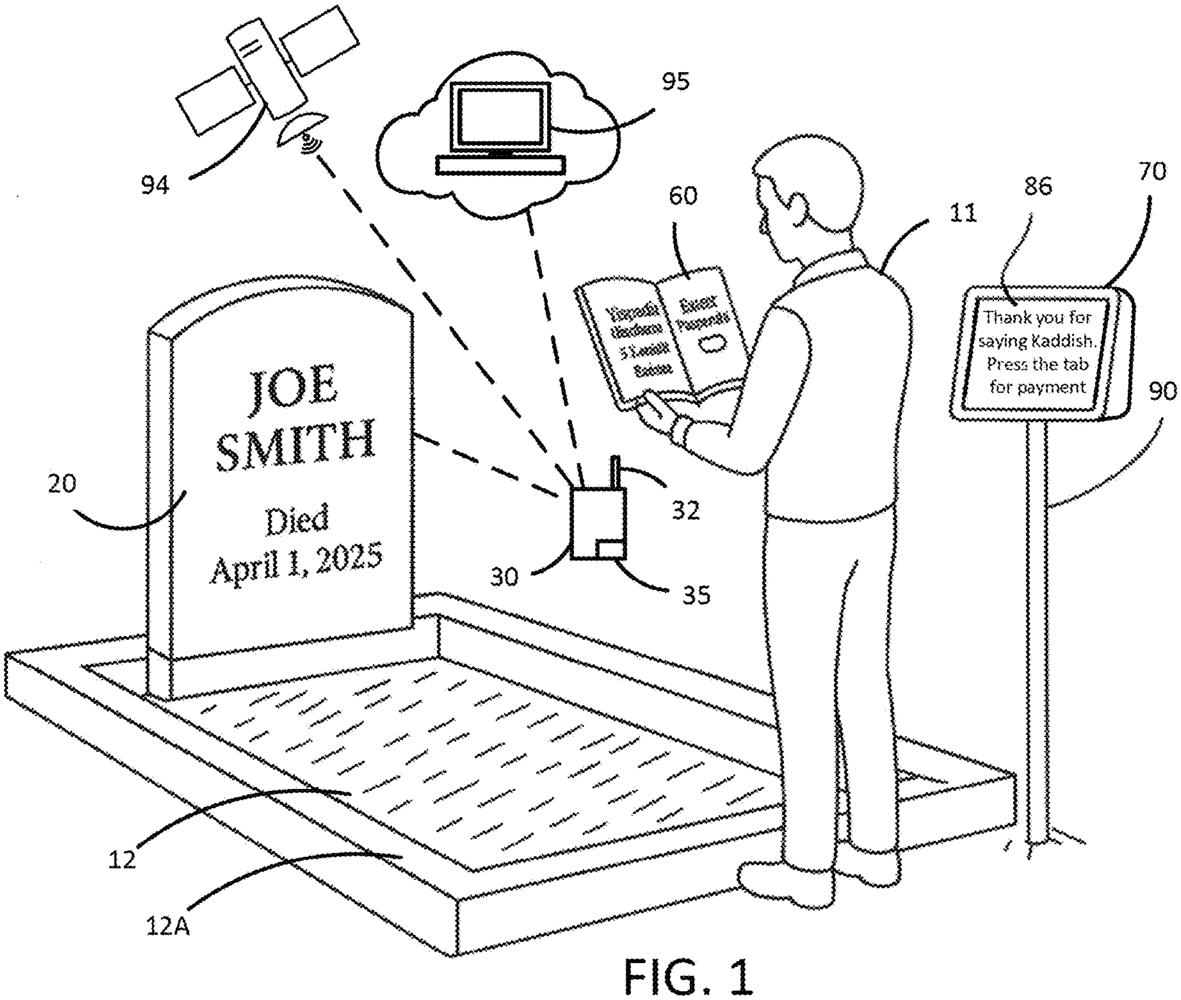
FIG. 1 is a schematic illustration of a client at a gravesite holding a mobile phone to read writing on the monument, in accordance with one embodiment.

The following detailed description is of the best currently contemplated modes of carrying out the invention. The description is not to be taken in a limiting sense, but is made merely for the purpose of illustrating the general principles of the invention, since the scope of the invention is best defined by the appended claims.

For each religion, there are specific prayers or recitations that are considered virtuous for people to recite at a grave of a deceased individual.

For example, there are certain prayers that are recited in a Jewish cemetery on anniversaries by certain close relatives of the deceased, for example a son. Some people, however, do not leave over such relatives, or those who are able and willing to do it. People who are bereaved and want their names to be remembered and continue to read Kaddish and Psalms over them. Or any blessing to choose the deceased Or their family members. Recitations chosen by the deceased can also be stories that highlight the deceased's good character, exemplary behavior and/or heroism (as that term is defined broadly).

For people who want the family to continue to come to the grave and praise and bless the name of the deceased, they can have their specific requests to have specific recitations made at their gravesite implemented for years to some. The deceased will be able to reward specific people's actions (in performing a recitation at the deceased's gravesite) on special months or dates using funds that can be spread out over any period of time that the deceased chooses.

People want to create a deep connection with the next generations and want to rest in peace knowing that their values will be carried on for generations. They can do so by continuing to give specifically designated amounts of money for those who come to the grave for future generations. Not only can they reward someone's recitation of a Psalm or a religious memorial prayer that elevates the soul of the deceased at the gravesite, but they can also reward someone for telling relevant stories about the deceased (for example stories that highlight the values of the deceased) or they can reward the naming of grandchildren or other descendants after the deceased so that the deceased's name will not be forgotten for future generations. These kinds of activities can provide the deceased will a lot of satisfaction just prior to their departing this world and can provide even more satisfaction to their soul after they become deceased.

Furthermore, as a result of this the deceased will be able to perform good deeds in this world after they are not alive. For example, by stipulating that the funds will be given to two brothers who are not on speaking terms if they both appear together at the cemetery and recite a specific prayer, they can help heal old wounds and unite their family (even repairing rifts that could not be repaired during their lifetime). This provides them with satisfaction (knowing that they can do this) before they die and elevates their soul after they are deceased.

In addition, people can also pass on their values to the next generation this way. They can also give money to people in need of a blessing, such as poor people. The deceased can give charity this way.

Furthermore, the deceased can have an impact of his or her descendants as well as other relatives and friends and even strangers for generations to come. Normally, people do not know much about their great-grandparents or great-great grandparents. Using this system, method and apparatus, this can change—people can continue their relationship with deceased relatives in a meaningful way for generations to come.

People, after their death, are willing to transmit the values and stories of their lives to people who show up at their gravesite and watch a short video and/or hear the story of their life and the values they believe in and want to pass on to future generations.

In certain embodiments, the deceased sets up a set of instructions for distributing the deceased's own funds to people based on the identity and/or the category that they are in, for example whether they are relatives, which relatives, what amounts and under what conditions and during which periods of time.

The deceased may let it be known in his or her instructions that whoever comes to the gravesite and says prayers or other recitations, or a particular recitation in accordance with the deceased's religious beliefs, which recitation may elevate the soul of the deceased, will receive at the gravesite, as soon as the recitation is performed, a payment electronically or will receive a confirmation of payment.

The principles and operation of a System, Method and Apparatus for Incentivizing Intergenerational Prayers and Other Gravesite Recitations For a Deceased Using Funds of the Deceased may be better understood with reference to the drawings and the accompanying description.

One embodiment is a system 10 for incentivizing recitation, for example prayers, for example special soul-elevating prayers, or other recitations that the deceased wants recited to carry forward his or her memory and/or legacy. These recitations take place at the gravesite of a deceased and responsively the deceased, through system 10, dispenses a reward, for example for a preselected payment chosen by the deceased. The payment comes from a fund that the deceased set up in accordance with the system 10.

The system 10 may include an application 35 that may be maintained on a mobile phone 30 or other device of a client 11. The application 35 may be opened on the mobile phone 30. The term "application" as used in this patent application refers to a piece of software that bundles together several features that become available on the device that the application is stored on. In this case the features would include authenticating oneself vis-A-vis a particular deceased individual, whose recitation requirements would be recorded in a database or look-up table or list maintained by remote computer 95, receiving communications from remote computer 95 as to what recitations are required by the deceased to the device 30, using the application to verify the location of the device 30 in one of a number of ways (including but not limited to photographing or scanning the contents of a monument 20, short range communications (such as Bluetooth®) to a rear of the monument containing a microchip 50 or a QR code 40 or other methods mentioned herein such as location sharing (FIG. 5A-FIG. 5B) or not mentioned herein) and verifying that the client indeed performed the recitation at the gravesite and finally using the device 30 to electronically receiving confirmation of payment and/or actual electronically provided payment in an amount defined by the set of instructions of the deceased and/or payout rules forming part of the software or memory, the payout rules derived from the deceased's set of instructions. In a further embodiment, the features of the application 35 include fewer than all of those features. In some implementations, the application also includes a feature of transmitting data from device 30, 430 to remote computer 95 for location verification or for recitation verification or for confirmation that payment was received. These combination of features (or some of them in other implementations) are also available on an application 435 on a device 430 of apparatus 400.

A client of system 10 may open up an application 35 on client's mobile phone 30 and authenticate himself by entering a user name and password. The term "client and the term "user" are used interchangeably herein.

System 10 may include a computer 95, such as a server computer 95, such as a computer that is maintained by the system 10, and that may be situated in cyberspace. The system computer 95 may store the locations of the graves of a series of deceased individuals and may also store the content visible on a monument at such gravesite. Furthermore, for each deceased, the will be stored on the computer 95 a set of instructions regarding how portions of a monetary fund, for example from the deceased's estate, is to be distributed. In some scenarios, portions of this information, as it relates at least to a particular deceased, ("deceased" means a deceased individual), is accessible by opening the application and/or may be stored on the application once the client authenticates that he or she is one or the persons on a list of people who have some relationship to that particular deceased In addition, the client or user who opens the application may see certain of this information by looking at the screen of his mobile phone (or in some scenarios by accessing the application on his tablet computer or other portable device, for example other portable device).

The term "plot" as used herein refers to the plot that one purchases at the gravesite including the border 12A around it. In the drawings herein the plot 12 is designated as "12". The term "gravesite" although generally similar to plot 12 is slightly broader and refers to the area of the plot 12 plus any passageways or borders immediately adjacent to the plot 12 or its border 12A. Therefore, someone standing on any border of the plot 12 is considered at the gravesite even though technically outside the plot 12. Furthermore, the phrase "at the gravesite" is defined by the deceased's instructions to mean within a preselected distance of the gravesite 12. Typically, that distance would be relatively small such as 10 feet but it may vary in accordance with the instructions of the deceased in the deceased's set of instructions.

FIG. 1 shows the gravesite having a monument 20. As shown in FIG. 1, a server computer 95 may be located somewhere in cyberspace and may interact with a mobile phone 30 of a user (e.g. a man 11 as shown in FIG. 1), sometimes referred to as a client, who came to the cemetery and in particular to the gravesite of the particular deceased. The remote computer 95 may be a computer that controls a web site of the system 10 that the client or user can interact with. For example, the client can go to the web site controlled by the remote computer 95 and input (i) details of the client/user's identity and contact information so as to authenticate the client (also stating the relation to the deceased, if necessary) and (ii) bank wiring instructions for an anticipated payment.

FIG. 1 shows the mobile phone 30 owned by the client whose location was determined by a satellite 94 and forwarded to the central system computer 95 located in cyberspace. The computer 95 may verify the location of the client 11 in relation to the grave of a particular deceased. This may occur, in one scenario, only after the client 11 has opened the application on his mobile phone 30 and authenticated himself. The location verification may be defined in relation to the plot 12 or gravesite of the particular deceased and may be defined as needing to be within a certain distance of the plot 12 or gravesite 12 or in some scenarios, within a certain distance of an object at the gravesite 12 such as the monument 20. The distance may be defined for example by a radius (a direct line from any direction in any direction known as "as the crow flies" or alternatively a direct line along a plane parallel to the ground). Alternatively, the distance may be defined by the combined distances needed to be traveled or walked along the ground to arrive to the gravesite or the object at the gravesite (i.e. walking down this path and then turning and walking a few feet along this path). These are just non-limiting examples.

The application 35 (i.e. application program or application software) of system 10 may be stored on a user mobile phone 30 (and may also be stored on server computer 95). Application 35 may include the capability of providing to the client 11 (for example by downloading from the server computer 95 or from any other digital location) the specific recitation that the specific client 11 needs to recite as provided for in the set of instructions of the deceased. This downloading (or other means of providing) of the recitation may occur, in some embodiments, after verification of client 11 at the gravesite occurs. Alternatively, for practical reasons, in some scenarios, it could occur well before then—so that the client 11 could then be prepared to bring a suitable book or other material from which the recitation is made in case this is more comfortable to read from (or in case it is more religiously appropriate that the recitation be read from a special book).

System 10 may include a gravesite object, for example gravesite objects 12, 12A, 20, 21, 22, 70, 80, 83, 90 or any other object affixed to the gravesite such as a kiosk, or may be a mobile gravesite object (such as a mobile communication device 30, 37) held by a user at the gravesite. The gravesite object may incorporate a payment module, the payment module including a computer 80. The gravesite object may be on or embedded into a ground of a gravesite of the deceased or on or embedded into a second gravesite object that rests on or is embedded into the ground. The gravesite object may also be on a second gravesite object that rests on a ground of the gravesite or that rests on a floor offset from the ground of the gravesite. The computer 80 may include an application 35.

Figure 11A:
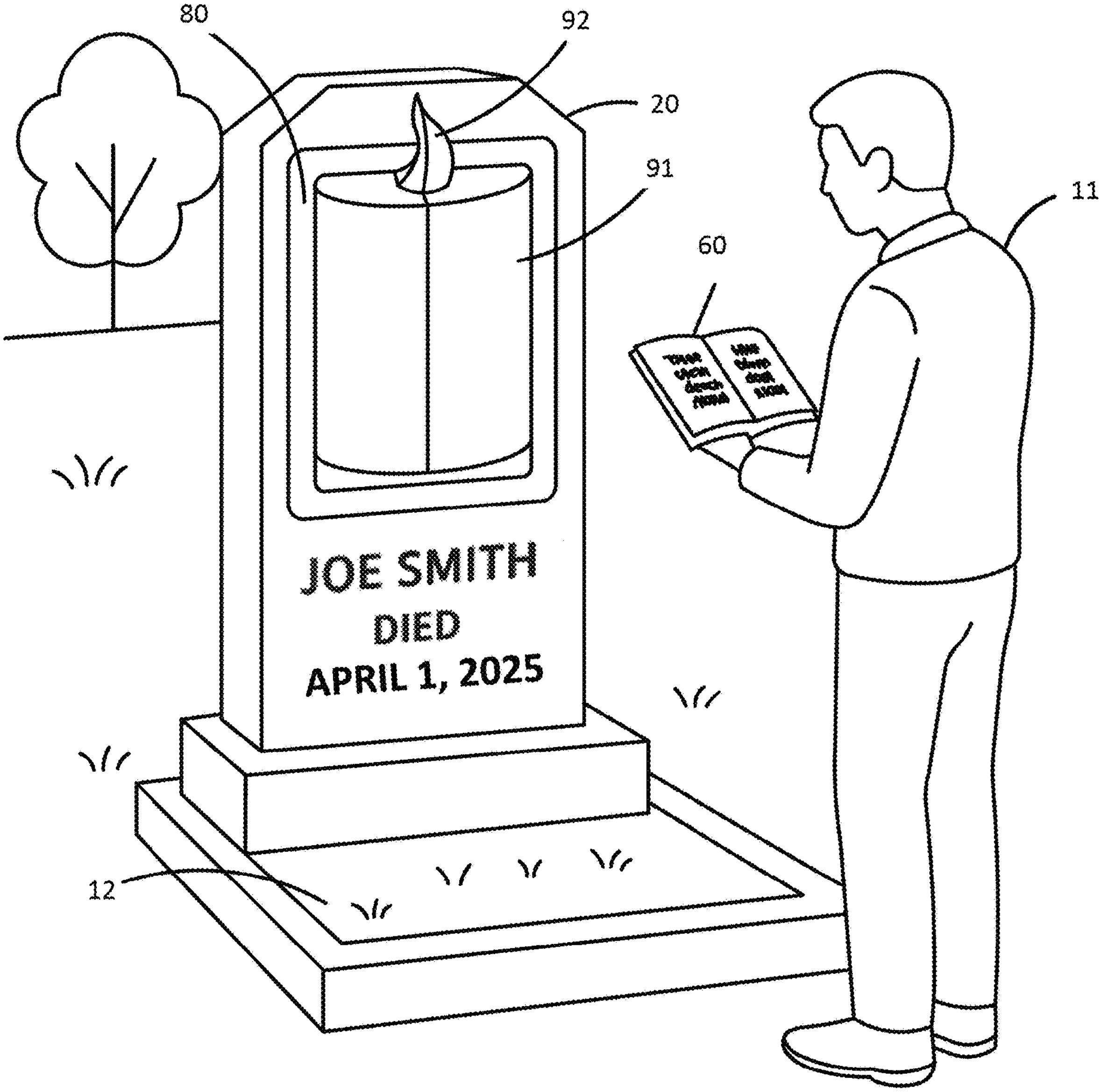
FIG. 11A is a perspective view of a monument whose computer is covered by doors shaped in the form of a candle and flame, in accordance with one embodiment.
Figure 11B:
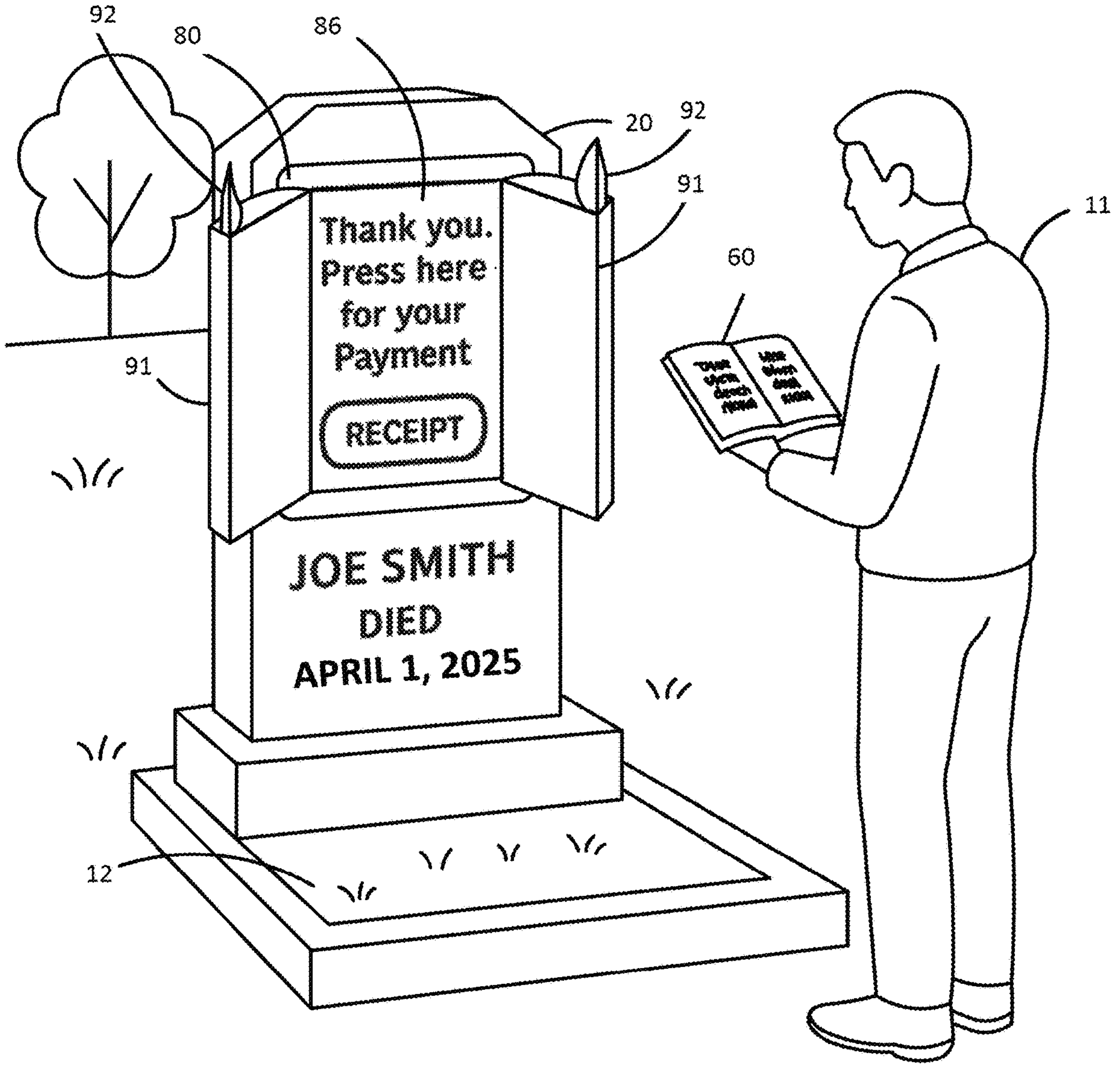
FIG. 11B is a perspective view as in FIG. 11A but with the doors open so as to reveal the computer and digital interface of the payout module, in accordance with one embodiment.
Figure 12A:
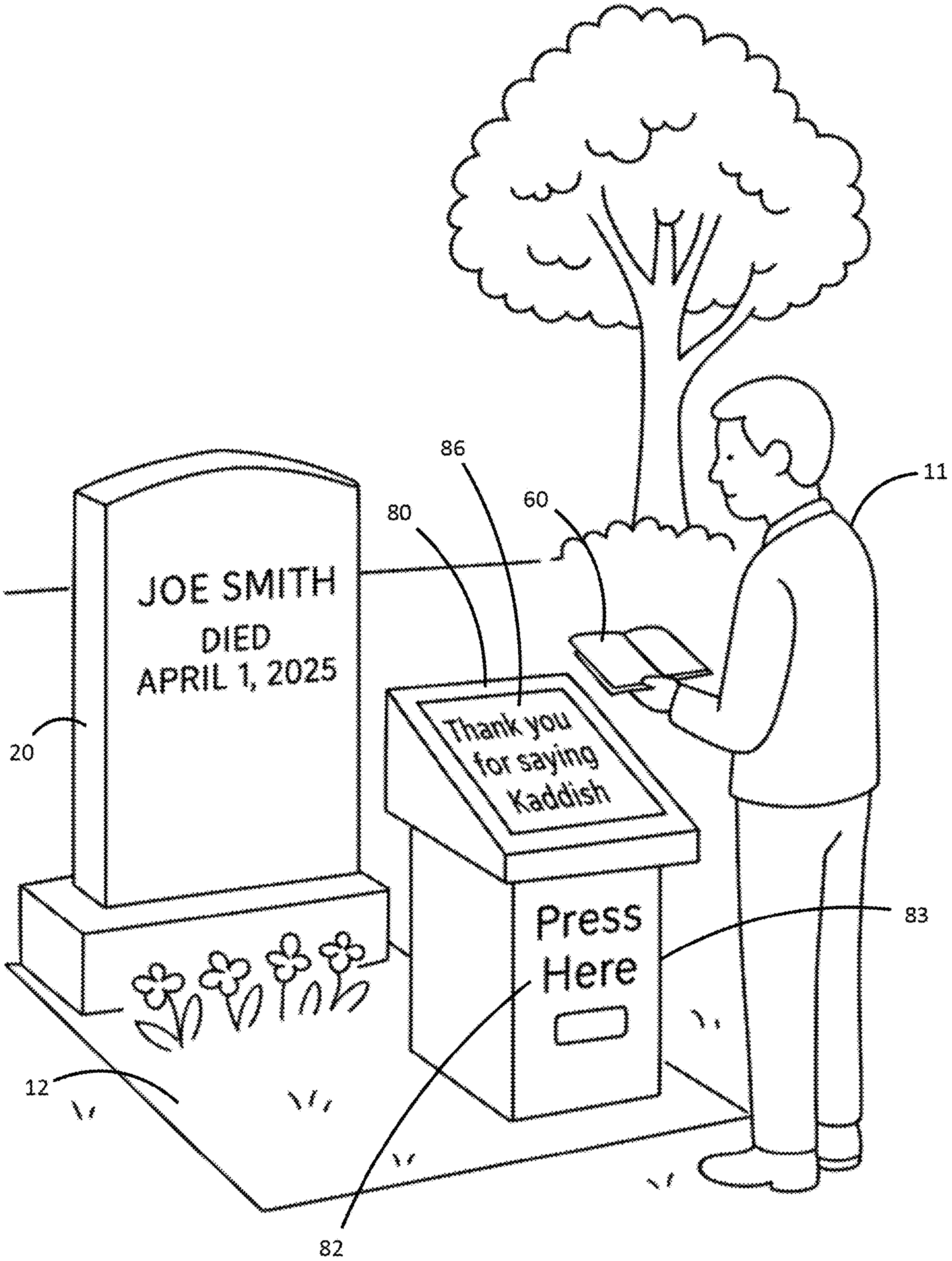
FIG. 12A is a perspective view of a plot including a payout station at a gravesite including a computer and LCD screen, in accordance with tone embodiment.
Figure 12B:
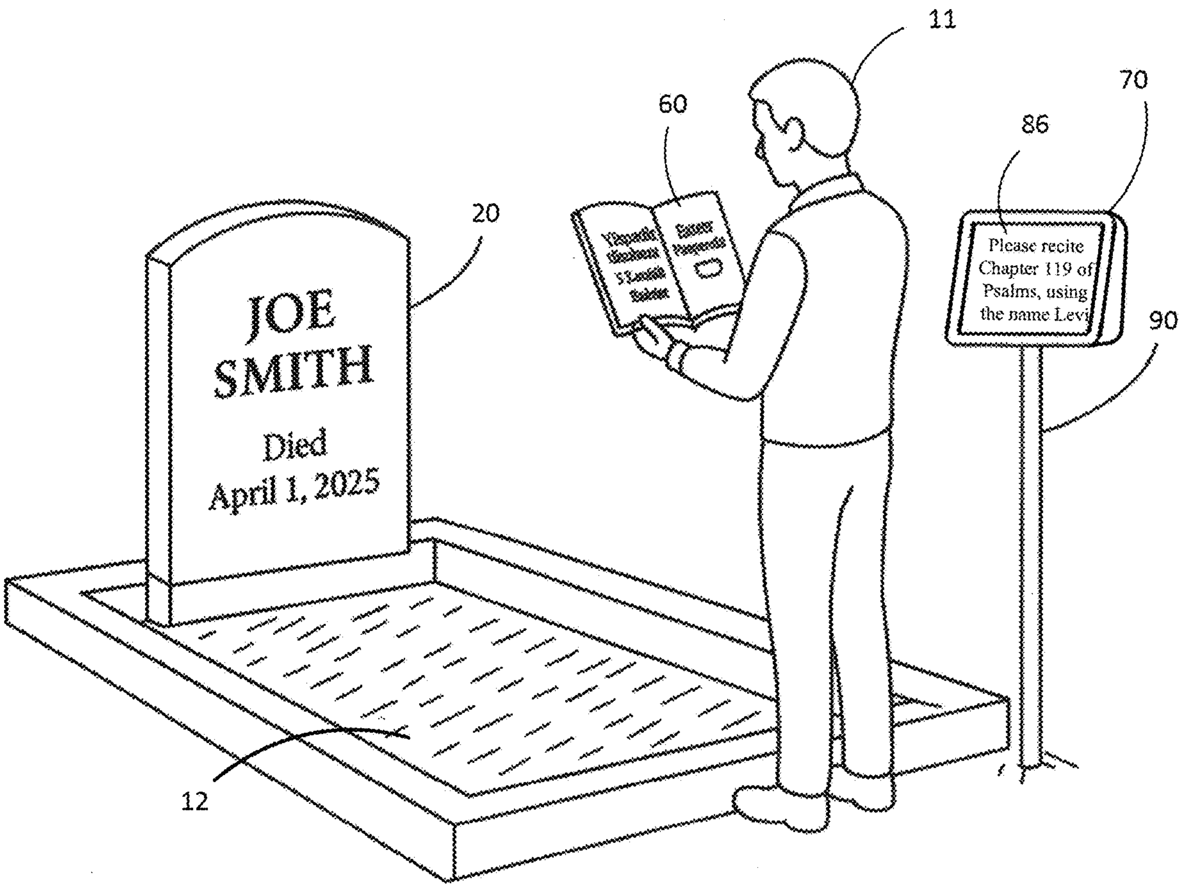
FIG. 12B is a perspective view of plot including a computer standing on a gravesite object and notifying a client of a recitation that he should recite, in accordance with one embodiment.

System 10 may also include a payment module 82 at the gravesite. Payment module 82 may comprise an automatic teller machine (ATM) and may have additional software so as to be configured for dispensing or issuing a payment or a payment voucher or a confirmation of payment to a client 11 at the gravesite. Payment module 82 may be a standalone element and may include a computer screen 86 (FIG. 1) and may be situated on a gravesite object (or a mobile gravesite object held by the client 11 such as the tablet computer 37, 437 in FIG. 12E and FIG. 17E or the mobile device 30 in FIGS. 1, 18) such as on a post 90 (FIG. 7, FIG. 12B) embedded into the ground or on a bench (FIG. 12C, FIG. 17C) or on a base of a computer station 83, 483 (FIG. 12A, FIG. 17A) or on a monument 20 (FIG. 8, Fig. FIG. 10, FIG. 11A-11B, FIGS. 14, FIG. 15, FIG. 16A, FIG. 16B) at the gravesite or may be implemented in other scenarios. Although the post 90 in FIG. 12B and FIG. 17B is shown as a relatively thin object, post 90 in either of these two figures may in fact be much thicker, and may be a substantially square or substantially rectangular or substantially cylindrical or substantially frustoconical or trapezoidal stand for example.

Figure 10:
FIG. 10 is a schematic embodiment of a man, having recited a memorial recitation, in place to interact with a payment module, in accordance with one embodiment.

The payment module 82 may comprise a computer or tablet computer or other computer appliance that includes, memory, programmable instructions and a processing unit. In addition, payment module 82 may comprise bank or printed paper such as printed receipts (not shown) or payment confirmations as well as a printer (not shown) since it may be configured to dispense such receipts. The printer may be for example a matrix printer or a thermal printer or any other suitable printer for printing paper or other receipts, confirmations, instructions, etc). In some embodiments, as shown in FIG. 10 (and FIG. 15), payment module 82 may comprise or include an automatic teller machine (ATM) 88 that is configured to dispense actual cash 89, 489.

In general, an automatic teller machine (ATM) comprises at least a computer, a printer and a digital interface such as an LCD screen. The LCD screen is an output device to communicate transaction options, instructions, and confirmations to the client, all coordinated by the ATM's central computer unit. The LCD screen may also be a touchscreen, and also function as an input device communicating the client's selections (and data). The computer of the ATM may, using programming instructions, process the transaction and send the information to the LCD screen to be displayed for the client (user).

Payment module 82 may also be a feature of application 35 of mobile gravesite object held by the client such as mobile device 30 whereby using the digital interface of the mobile device 30, the application 35, after verifying that the client 11 performed the recitation, issues either a payment voucher (for example redeemable at the remote computer 95) or an actual payment of cash or actuates an electronic payment confirmation (for example by sending instructions to a web site or computer 95 that either sends an instruction electronically to a payment conduit with details of the wire transfer transaction to the client or that acts itself as a payment conduit for financial institutions, wherein the financial institution is the entity that actually processes wire transfers or by sending instructions directly to a financial institution with details of a wire transfer) or transfers funds to the client 11 electronically.

The client may in some scenarios input the relevant wiring instructions using the touchscreen of the mobile device 30 to actuate the application 35 to make the payment. Alternatively, the application 35 may transmit the bank wire instruction or other data to the remote computer 95 (or the client 11 may have already registered and provided such information) and the remote computer actuates a payment electronically to the client's bank account using the client's wiring instructions or bank transfer details. Alternatively, the application 35 of device 30 may transmit the data to a payment conduit or to a financial institution directly.

Figure 22:
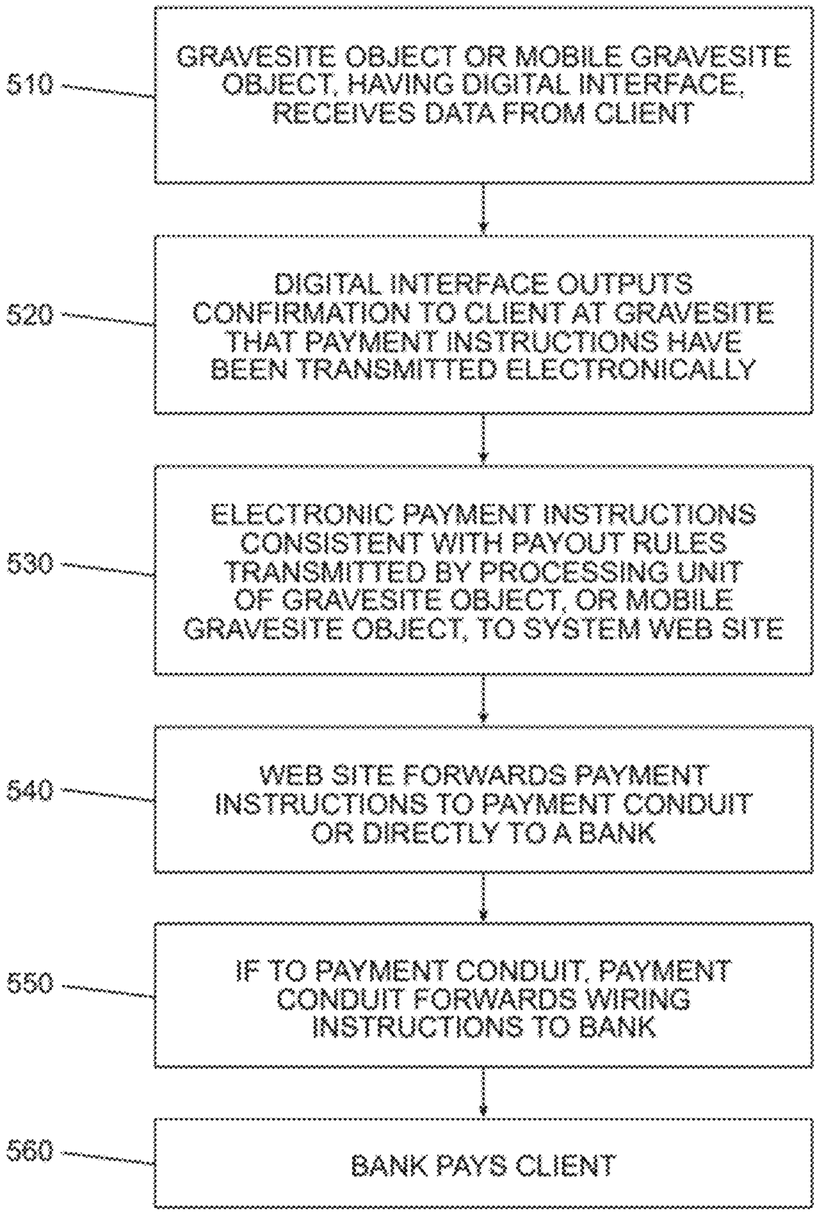
FIG. 22 is a flow chart for a payment method, in accordance with one embodiment.

FIG. 22 shows one non-limiting example of what happens to effectuate a payment to the client 11 (in connected with any system, apparatus or method embodiment herein). Box 510 indicates that a gravesite object or a mobile gravesite object having a digital interface may prompt the client and may receive data from the client regarding how to implement a payment to the client 11 (alternatively the client may have already provided this information or may provide such information to remote computer 95). Box 520 indicates that the digital interface may issue a paper or other on screen confirmation that payment instructions have been transmitted regarding a payment to the client 11. Box 530 indicates that the electronic payment instructions that are consistent with the payout rules (derived from the deceased's set of instructions regarding payment) is transmitted by the processing unit of the gravesite object to remote computer 95 which may comprise or control a web site of system 10. Box 540 indicates that the system web site may forward the payment instructions (in a form suitable for domestic or international bank wiring transactions) to a company that functions as a payment conduit, or directly to a bank or other financial institution. Box 550 indicates that that if the payment instructions were sent to a payment conduit (as defined herein) then the payment conduit send the bank wiring instructions in a suitable form and within a suitable banking system format and location to the bank or other financial institution. Finally, box 560 indicates that the bank or other financial institution pays the client 11 the amount called for in the payment wiring instructions which amount is consistent with the payout rules of the deceased.

In general, a system 10, including a gravesite object or a mobile gravesite object held by the client 11, may be configured to incentivize specific recitations, such as soul-elevating prayers for a deceased, and may include a computer 80 (or laptop computer or tablet computer or other appliance or mobile device incorporating a processing unit) embedded into a ground of, or into a monument 20 (or other gravesite object) at, a gravesite, of the deceased, or located remotely for example in cyberspace and which is in communication with a mobile device 30 of the client (user) including when the client is at the gravesite. The computer 80 may include a memory that stores or is configured to store a set of payout rules, derived from a set of instructions recorded by the deceased regarding how to distribute portions of a fund in exchange for particular persons performing a recitation at the gravesite. The memory may also store a content of words and/or or images appearing on the monument 20 of the gravesite. Alternatively, the computer 80 may merely have access to the memory and the memory 96 is a part of a remote server computer 95 that is located outside the gravesite and even outside the cemetery, for example in cyberspace (and in that case the memory incorporated into the computer system embedded into the gravesite object would still in some embodiments at least temporarily store the set of payout rules (or the set of instructions of the deceased)).

The computer 80 may include a digital interface 86 configured to prompt the client to authenticate the client's identity. As shown in FIG. 12B, the digital interface 86, besides allowing an interaction with the client so as to authenticate an identity of the user (for example by sending a token or by a short range communication), the digital interface may also allow presenting to the client the recitation that the client needs to perform at the gravesite.

In accordance with system 10, the server computer 95 upon verification of the location of the client, may check what category of persons the client is a member of and based on that, present to the client the content of the preselected recitation associated with the particular client 11. This may be determined from the computer 95 accessing a database provided by or derived from the deceased's set of instructions.

The computer system 80 or payout module 82 (or application 35 in the mobile device 30) may verify that the client has indeed recited the preselected recitation. This can occur in a number of ways including but not limited to using a camera or other component to generate an audiovisual recording of the recitation by the client at the gravesite and sending to the computer server 95 for verification or by performing on-site verification using a camera and/or recognition software (such as voice and/or visual or facial or lip movement recognition software) that compares to previously stored voice and/or lip samples of the client In one scenario, the client 11 at the gravesite performs the recitation in front of a standalone camera 22, 422 (FIG. 12C, FIG. 17C) embedded into a gravesite object or mobile gravesite object (30, 37, 430, 437) in front of camera that is part of a device (for example a computer, a mobile tablet computer, a laptop computer, a desktop computer, an e-reader, a mobile smartphone, a smart-TV or a smartwatch incorporating the camera) and the device is incorporated into a gravesite object. It should be understood that any of the aforementioned devices shall be understood to incorporate a computer system that includes a digital interface and a processing unit. Thus the term "computer system" as used herein is not to be limited to large computers or desktop computers or laptop computers and includes devices that incorporate processing units.

Upon verification that the client performed the recitation at the gravesite, system 10 may make a payment to the client. Specifically, upon verification that the client performed the recitation at the gravesite required by the deceased's set of instructions or the payout rules derived from them, The payment module 82 or more particularly the computer system of the payment module 82 may comprise a digital interface and a payment mechanism such as a modified ATM machine (that has been modified to have programming instructions stored on a memory and executed by the ATM's computer 80 to issue payments or send transmissions of payment instructions to payment conduits or financial institutions to effectuate a wire transfer and to control the digital interface to prompt the client to input bank wiring instructions if the system's remote computer 95 does not already have such information) may output, at the gravesite, a payment to the client of the preselected amount in the form of an electronic payment and/or in the form of a confirmation of an electronic payment and/or in the form of a voucher. The payment or payment voucher or payment confirmation conforms to the payout rules which derive from the set of instructions of the deceased. Examples of this payment module 82 are shown in FIG. 8 through FIG. 12C.

The term "payment conduits" as used in this patent application refers to companies of which the following are examples: Wise®, Payoneer®, Paypal®, Stripe®, Zelle®, Venmo®, that act as payment conduits between customers who instruct them to perform bank wire transfers of funds and financial institutions that actually process the bank wire transfers. The payment conduits may, in some cases, operate by linking their customers' accounts to those customer's bank accounts.

Figure 8:
FIG. 8 is a schematic illustration of a man reciting a memorial recitation at the gravesite where the monument incorporates an embedded tablet computer, in accordance with one embodiment.
Figure 9:
FIG. 9 is a schematic embodiment of a man, having recited a memorial recitation, in place to interact with a payment module that is communication with a remote server computer, in accordance with one embodiment.

In FIG. 8 and in FIG. 9, the payment module 82 is embedded in the monument 20 at the gravesite. In FIG. 10, the payment module 82 is configured to dispense cash 89. In FIGS. 11A-11B the payment module is covered or uncovered by doors 91. In FIG. 12A the payment module 82 is in the form of a computer station 83 (that may incorporate an ATM or modified ATM machine 88 (that has been modified to have programming instructions stored on a memory and executed by the ATM computer to issue payments or send transmissions to payment conduits or financial institutions to effectuate a wire transfer and to control the digital interface 86 to prompt the client to input bank wiring instructions if the system's remote computer 95 does not already have such information)) incorporated into a gravesite object (computer station 83) that is not the monument 20 but rather is shaped as a base onto which a computer 80 or computer station as positioned. Likewise, in FIG. 12B and in FIG. 12C the payment module is incorporated into a differently shaped gravesite object.

Figure 7:
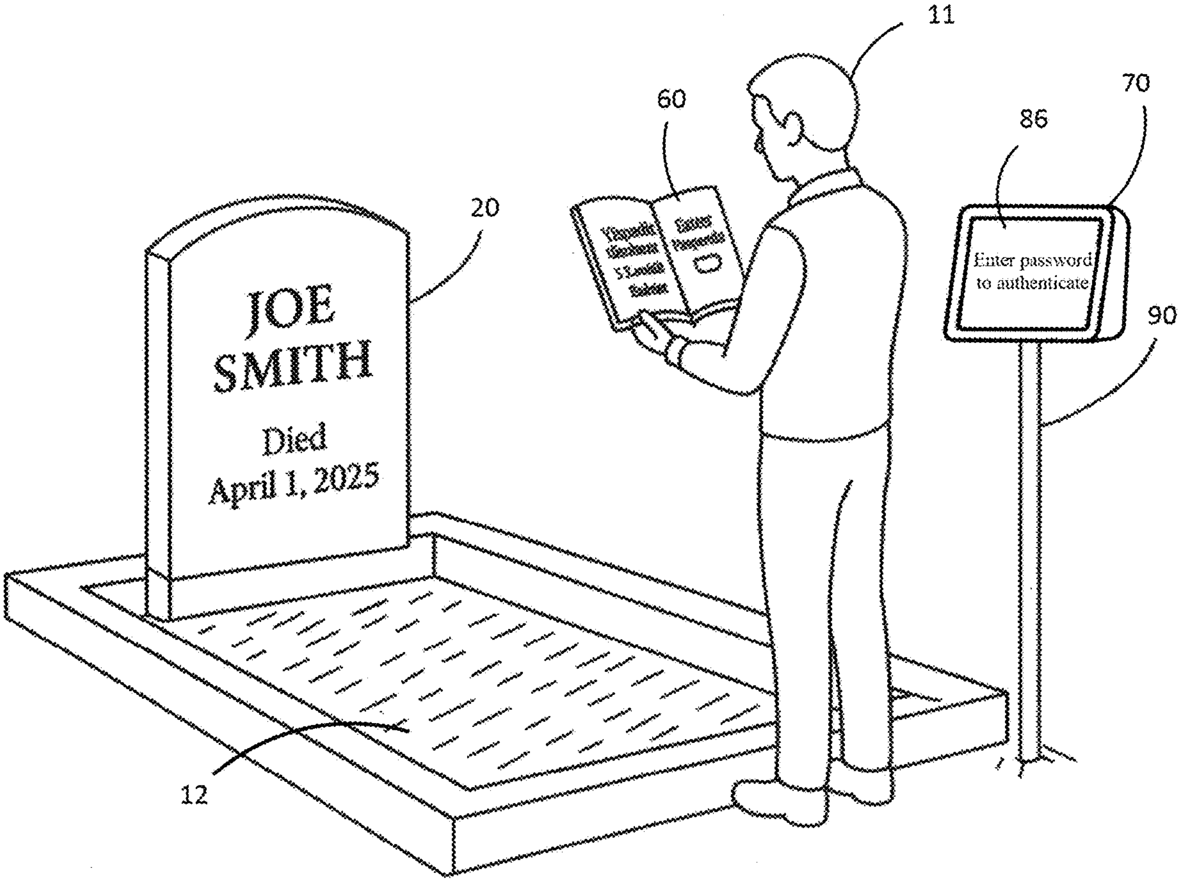
FIG. 7 is a schematic illustration of a man at a gravesite reciting a prayer for the deceased, in accordance with one embodiment.

In one embodiment, system 10, configured to incentivize specific soul-elevating prayers for a deceased, may comprise a dedicated computer station 70 (FIG. 1, FIG. 7) embedded into a gravesite object, such as a pole 90 that is affixed into the ground of the gravesite or in other scenarios such as a monument 20 situated on, the gravesite, of the deceased. The pole 90 in FIG. 1 and in FIG. 7 are considered to be at the gravesite and within the gravesite. As shown in FIG. 1, FIG. 2, FIG. 3, FIG. 6 and FIG. 8, system 10 may include a computer server 95 (remote from the gravesite) that includes a memory 96 storing a set of payout rules, derived from a set of instructions recorded by the deceased regarding how to distribute portions of a fund in exchange for a recitation at the gravesite. Memory 96 may also store the content of writing or images appearing on or engraved on the monument 20 and visible to visitors of the gravesite (including client 11). Although not visible in the drawings of FIG. 7 and FIG. 9 through FIG. 12B, the remote computer 95 may also exist as part of any of the versions of system 10.

Memory 96 may also be located on a dedicated computer 70, 80 (note that these numerals "70" and "80" can also be pointing to a dedicated tablet computer) or other device such as mobile tablet computer 37 (FIG. 12E)) at the gravesite such as on a post 90 (FIG. 1, FIG. 7) sticking out of the ground of the gravesite. In addition, particular computers 70, 80 or applications 35 (FIG. 1) on mobile phone 30 or embedded into the monument 20 (FIG. 8, FIG. 9) at the gravesite. Furthermore, any of the these computers or applications may have communication access to the memory 96 stored on the remote server computer 95.

System 10 may include a digital interface 86 for authenticating a client's identity. The digital interface 86 may comprise an LCD screen or an OLED screen on the client's mobile phone 30 or may comprise an LCD screen 86 or other digital screen on a computer or computer-related device 70, 80 embedded into or incorporated into any gravesite object at the gravesite.

In some embodiments, the digital interface, including the LCD or OLED screen of the digital interface, may be configured to implement the executable programmable instructions to authenticate the user by asking for user name and password and/or by checking a government issued ID or other photo ID or other suitably reliable ID. In some embodiments, a built-in camera 22 (built in to any gravesite object including but limited to a bench 21 (FIG. 12C) takes a photo of the ID. The computer 80 embedded in a gravesite object may communicate with the server computer 95 for the authentication process or the computer 80 may have stored on its memory a database of information about some clients or all clients or this particular client 11 so as to compare the data with the identity information that is provided to the computer 80.

The digital interface 86 may be configured to allow interacting with a client 11 so as to authenticate the identity of the user. The authentication process may also include a short range communication between the phone 30 and the computer 80, for example using Bluetooth or other short range communication protocol. The authentication may include sending a token to the mobile phone 30 of the client. Alternatively, the authentication may involve prompting the client 11 to link his mobile phone 30 to a QR code located on a gravesite object.

In some embodiments, the computer 80, for example using the digital interface, including for example the LCD or other digital screen, may be configured to present to the client 11 the recitation that is stored in memory 96, or that is stored on a memory of the computer 80 attached to a gravesite object based on the set of instructions of the deceased regarding the specific client 11.

In certain embodiments, computer 95 and/or mobile device 30 (and the application 35 stored thereon) and/or a dedicated computer, tablet computer 37, 437, camera or other device located at the gravesite may verify the location of the client 11 to confirm that client 11 is at the gravesite. Any of these devices or computers may also check the database on memory 96 to determine what category of persons the client 11 is a member of for purposes of determining the preselected recitation for that client 11 as per the deceased's set of instructions. The digital interface 86 would then present the preselected recitation to the client 11.

In general, the application 35 or a dedicated computer or device at the gravesite may also verify that the client has performed a condition of payment—namely, performing or reciting the preselected recitation. In one implementation, this occurs by generating an audiovisual recording of the recitation and sending to the computer server 95 for confirmation against a database of what recitation of the recitation should sound like (especially how the recitation by that particular client 11 should sound, for example using voice samples obtained before the visit to the grave). In another implementation, verification may be accomplished by performing an on-site verification using the application 35 or the dedicated computer 80 or dedicated tablet computer 70 or mobile tablet computer 37 that records the voice and/or lip movements of the client 11 during the recitation and uses voice recognition software and/or visual recognition software that compares what it records to previously stored voice and/or lip samples of the client or to other samples of other individuals.

Upon verification of the recitation at the gravesite, as seen in FIG. 8, FIG. 9 or FIG. 10, the mobile phone 30 of the client 11 or the application 35 stored therein or a dedicated computer 80 or tablet computer 70 or mobile tablet computer 37 located at the gravesite may output for the client 11 the preselected amount of an electronic payment or a confirmation of the electronic payment, or even cash, subject to the payout rules that derive from the deceased's set of instructions. These payments come out of the fund set up by the deceased.

Applicant recognizes that depending on the religion and religious beliefs of the deceased, there may a wide range of methods and amounts of payment that are appropriate. For example, the may be a wide range of feelings as to what in manner the payment to the client who performs the recitation should be made as well as what the appropriate amount of the payment would be considered tasteful, appropriate and religiously suitable and proper. The issue of the manner payment and the amount of payment will be determined by the deceased in accordance with his or her religious beliefs.

In some embodiments, the set of instructions of the deceased specifies which persons and/or which category of persons will receive what amount of payment from the fund and during what period of time, in exchange for reciting the recitation at the gravesite.

In some embodiments, the set of instructions specifies the conditions under which the client/person or particular persons/clients, shall receive the payment (or particular payments) in exchange for performing the recitation, i.e. reciting that which the deceased asked to be recited at the gravesite.

In some embodiments, the computer station includes a computer, a tablet computer and/or a smart communication device and programming instructions and memory configured to executed by a processor, the computer station.

In some embodiments, as shown in FIG. 8, the recitation is a memorial prayer said for deceased Jewish persons called Kaddish. In some embodiments, the recitation is a chapter of the biblical book of Psalms.

In some embodiments, the recitation is any portion of Scripture of any religion or any prayer meaningful in any religion, and especially those which are considered suitable to be said at a gravesite. The recitation may also be a meaningful story to be told about the deceased, especially one that highlights good characteristics of the deceased.

Figure 12C:
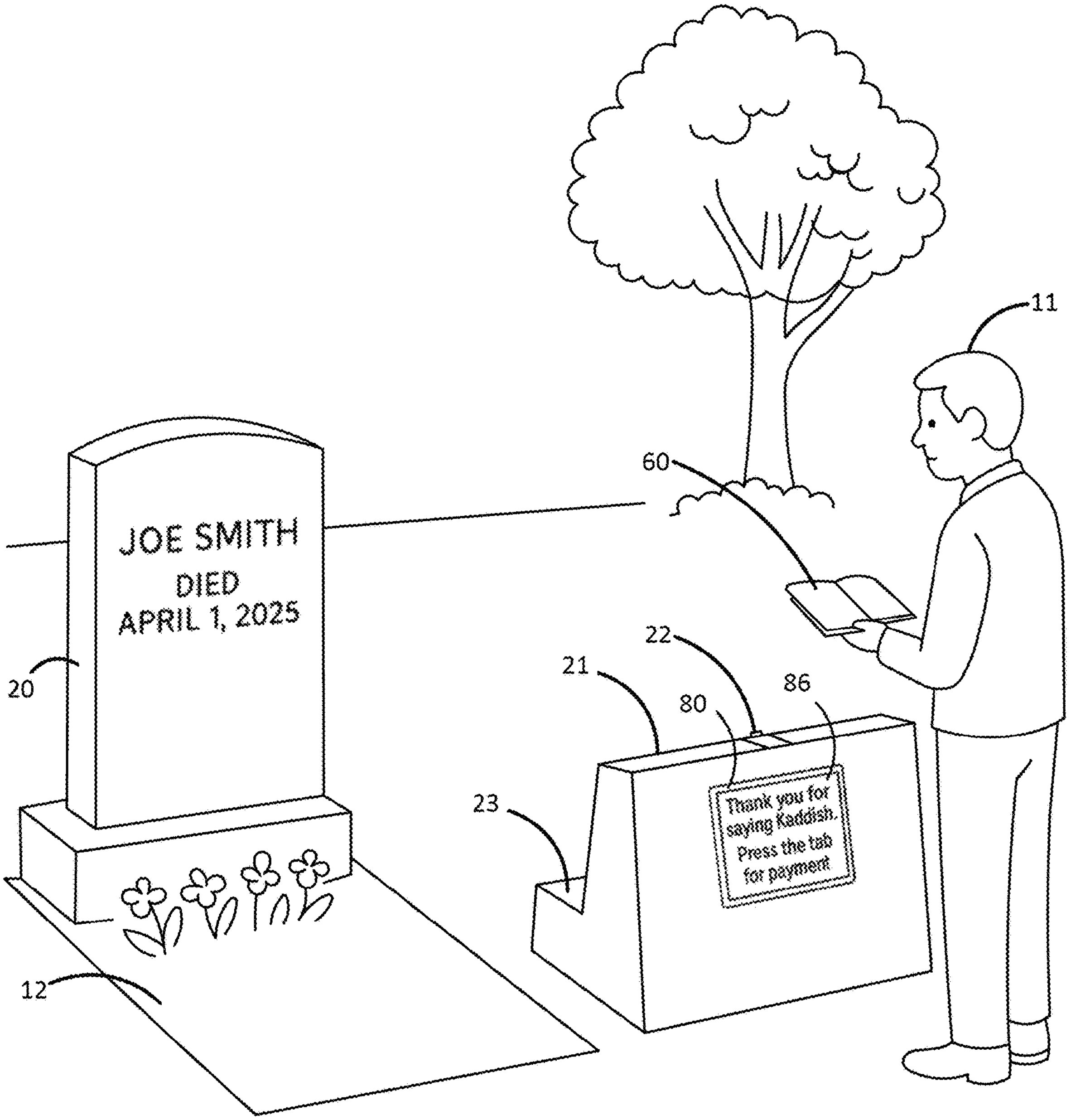
FIG. 12C is a perspective view of a plot including a gravesite object comprising bench with an embedded computer, digital interface and payout module and a camera, in accordance with one embodiment.
Figure 12D:
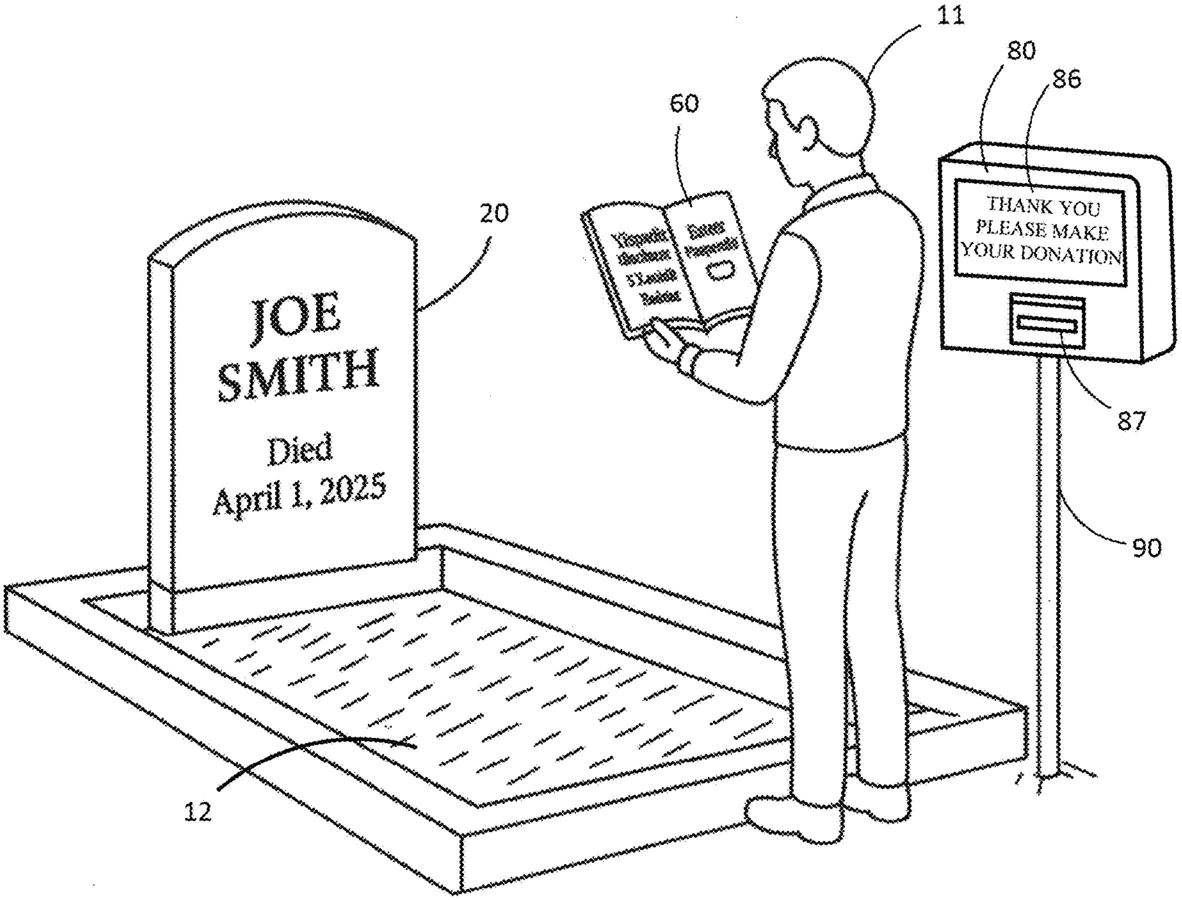
FIG. 12D is a perspective view of a cemetery plot including a gravesite object having a mechanism for making a charitable donation to the fund of the deceased, in accordance with one embodiment.

As shown in FIG. 12D, in some embodiments, the housing for computer 80 may also include a slot 87B (for example as part of an ATM machine or other charitable donation mechanism) configured, for example, to receive a payment in the form of an envelope 87A or checks 87A or cash 87A that can be inserted by hand by a client/user at the gravesite. The envelope may enclose a check or other funds. As shown in FIG. 12D, the LCD screen 86 or other digital interface 86 may prompt the user to make a donation to the fund of the deceased (the deceased's fund is the fund from which all of the payments come from to pay clients who perform a recitation in accordance with the set of instructions of the deceased), as seen from the front face of the computer station 83 in FIG. 12D. In some embodiments, a computer (not shown) in the computer station 83 (FIG. 12D) controls the LCD screen 86. The computer (not shown in FIG. 12D) has a CPU and memory that stores executable programmable instructions for prompting the user to optionally contribute funds to the fund of the deceased. In this way, the deceased can perpetuate the fund for an even longer period of time. Furthermore, this enhances the relationship between the client and the deceased and may be considered one type of an act of kindness toward the deceased. The exact use to be made of the charitable donations of a client/user are set by the deceased's instructions.

Figure 12E:
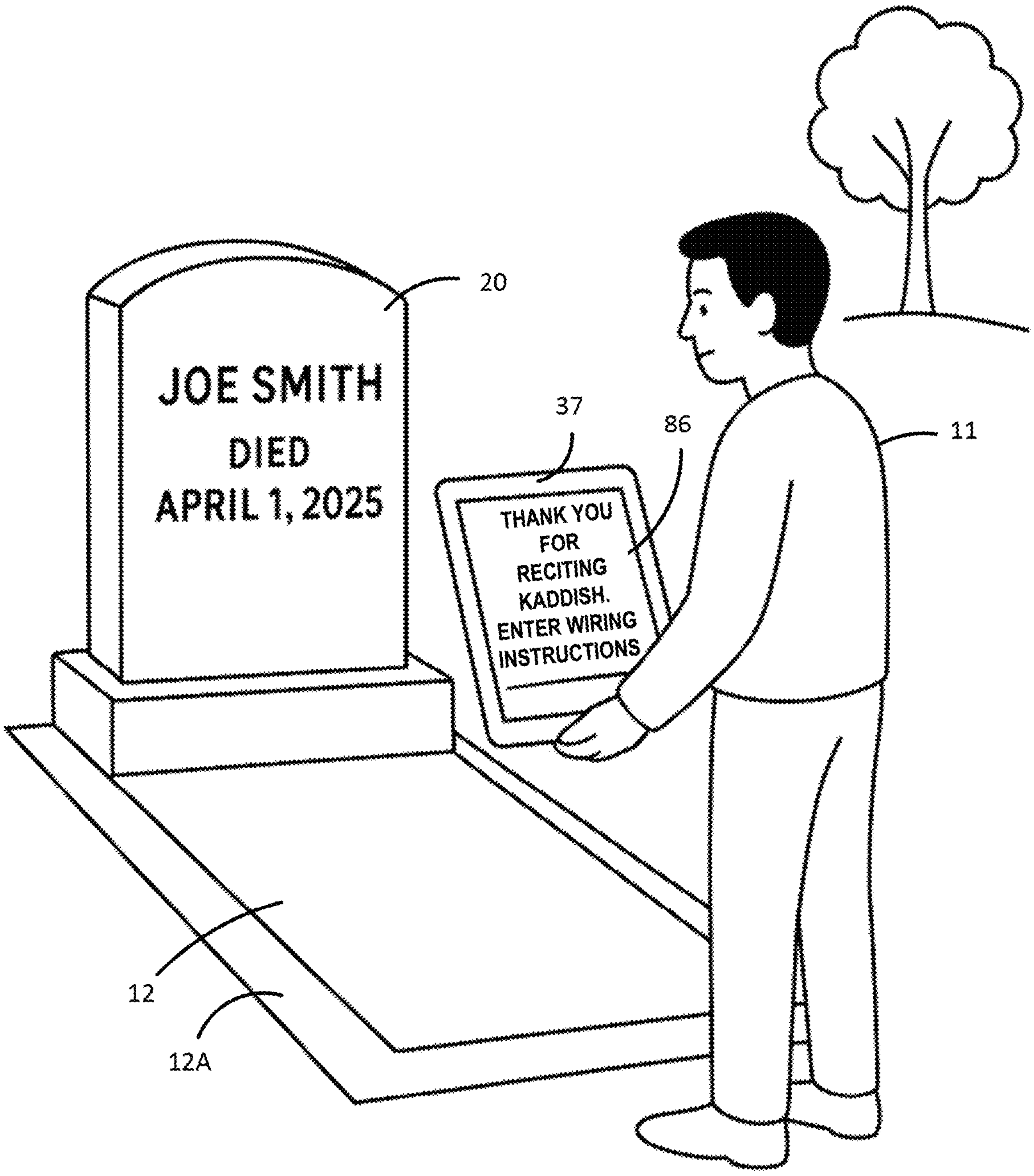
FIG. 12E is a perspective view of a cemetery plot showing a client holding a mobile tablet computer, in accordance with one embodiment.
Figure 13:
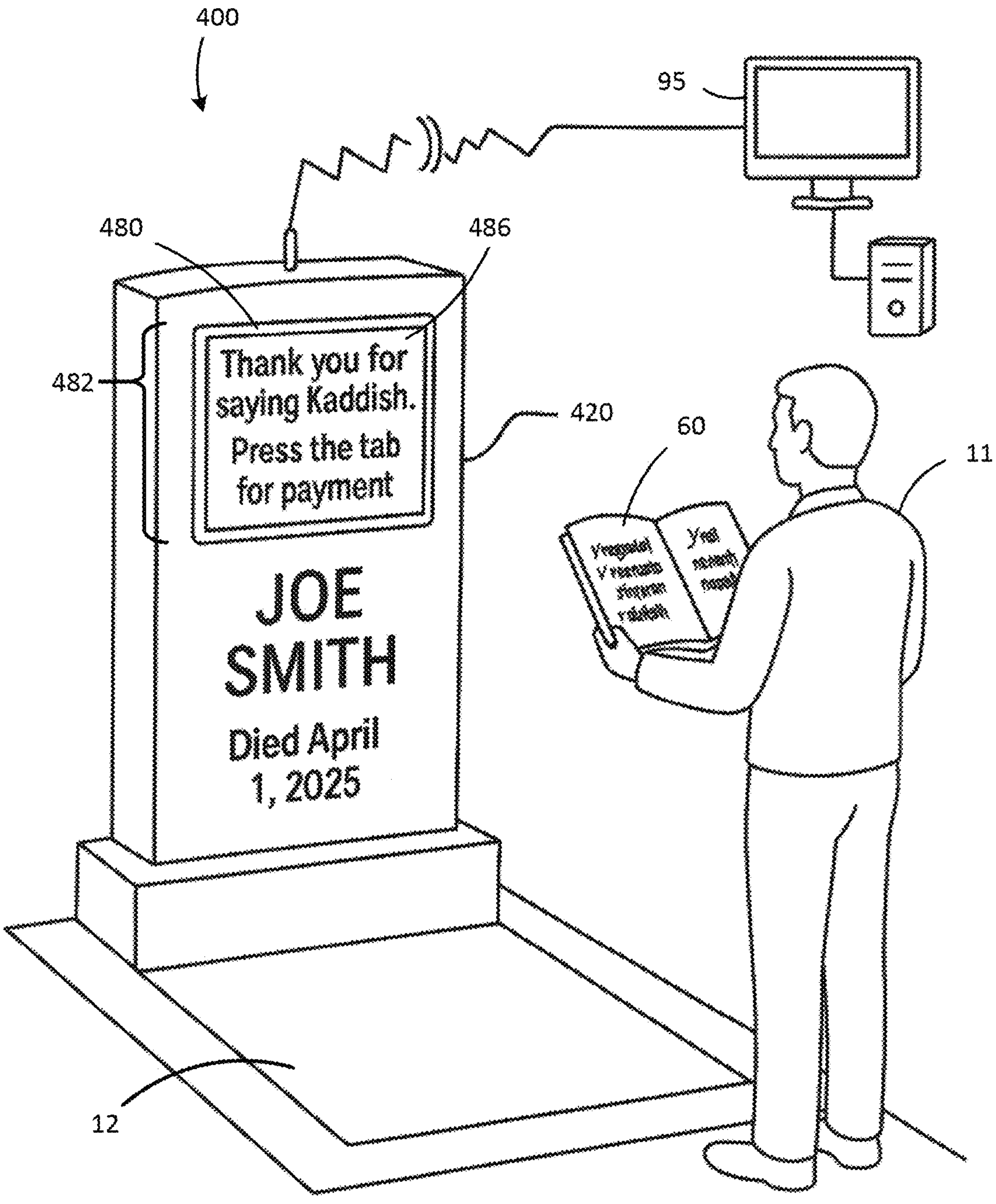
FIG. 13 is a gravesite payout apparatus similar to FIG. 8, in accordance with one embodiment.
Figure 14:
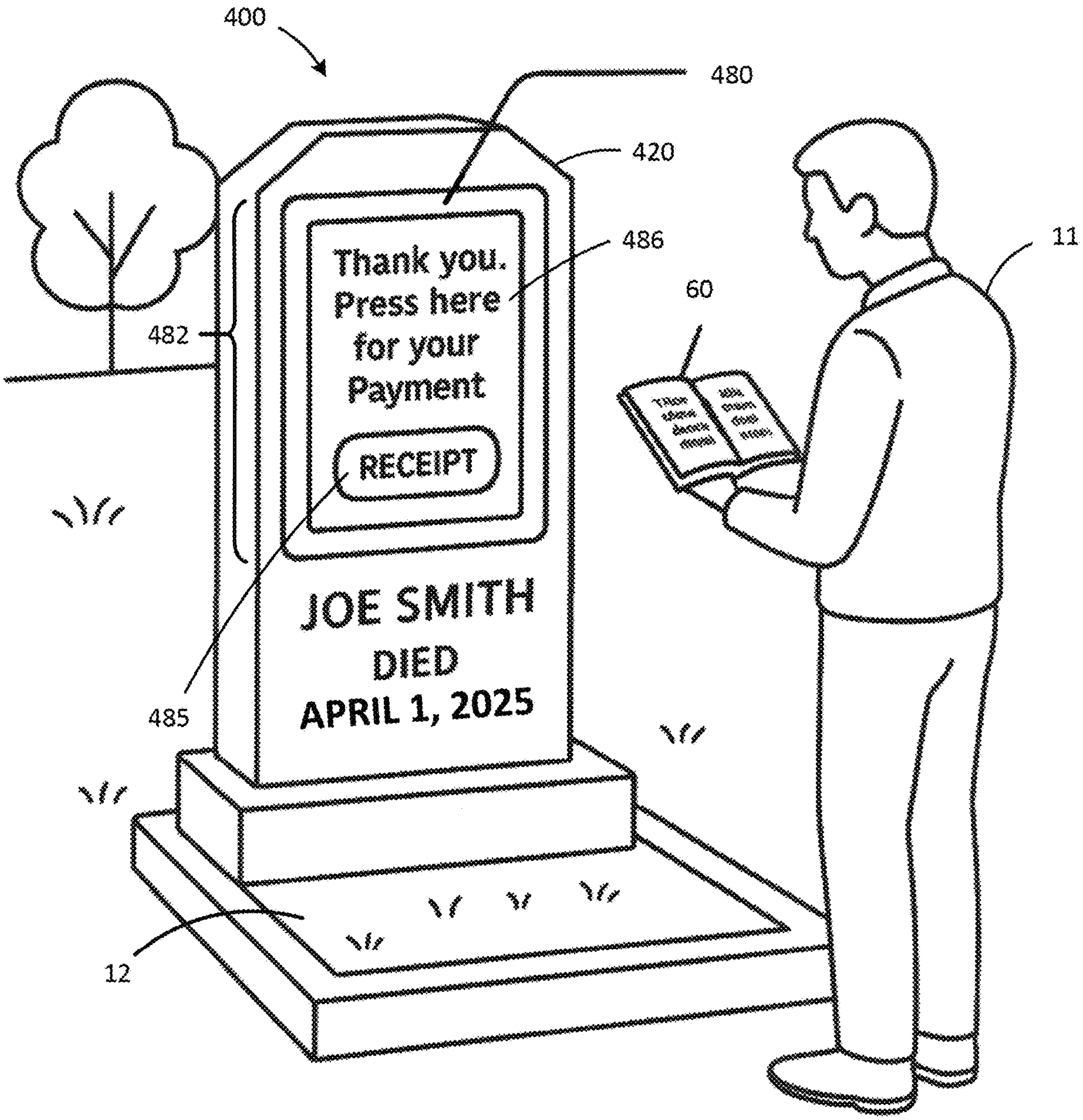
FIG. 14 is a gravesite payout apparatus similar to FIG. 9, in accordance with one embodiment.
Figure 15:
FIG. 15 is a gravesite payout apparatus similar to FIG. 10, in accordance with one embodiment.

FIG. 12E shows a client 11 holding a mobile tablet computer 37 after the client 11 performed the recitation required by the deceased's set of instructions (or payout rules derived therefrom). The LCD screen 86 may prompt the user to facilitate a payment. For example, as shown in FIG. 12E, the LCD screen or other digital interface may state something like the following: states "Thank you for reciting Kaddish. Please Enter Wiring Instructions". The mobile tablet computer 37 may also issue a digital confirmation of payment or a voucher or initiate an electronic payment (for example by transmitting a message with bank wiring details to a payment conduit that transmits to financial institutions to process a wire transfer) after the recitation and the client's input of wiring instructions.

In some embodiments, the verification of the fact that the client performed the recitation is by a computer at the gravesite or a mobile phone of the user or client at the gravesite taking a video of the recitation being performed. In one implementation, the executable programmable instructions stored on memory of the mobile phone 30 of the client or on the memory of a computer or tablet computer embedded in the monument 20 or situated on a post 90 or other object at the gravesite, when executed, takes a video of the user reciting the prayers at the gravesite. This can happen by pointing the mobile phone 30 at the client during the recitation or by moving the screen of the computer (at the gravesite) so that a camera within the computer takes a video of the client during the recitation.

In some embodiments, the video is stored on the computer of phone 30 for access by future users who are visitors to the gravesite.

Figure 2:
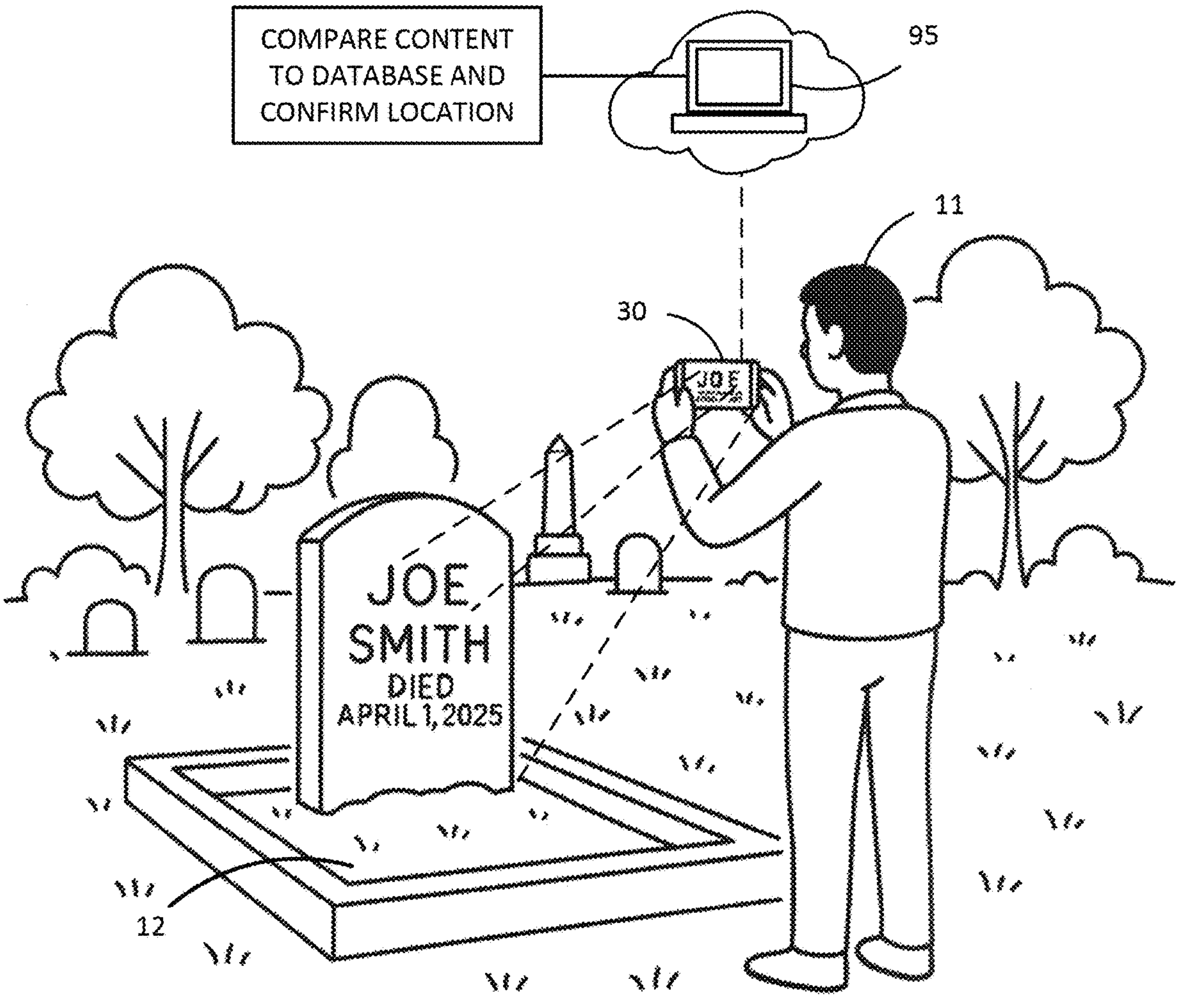
FIG. 2 is a schematic as in FIG. 1 with the client taking a photo of the monument and sending its content to a remote computer for comparison so as to verify location of the client, in accordance with one embodiment.
Figure 5A:
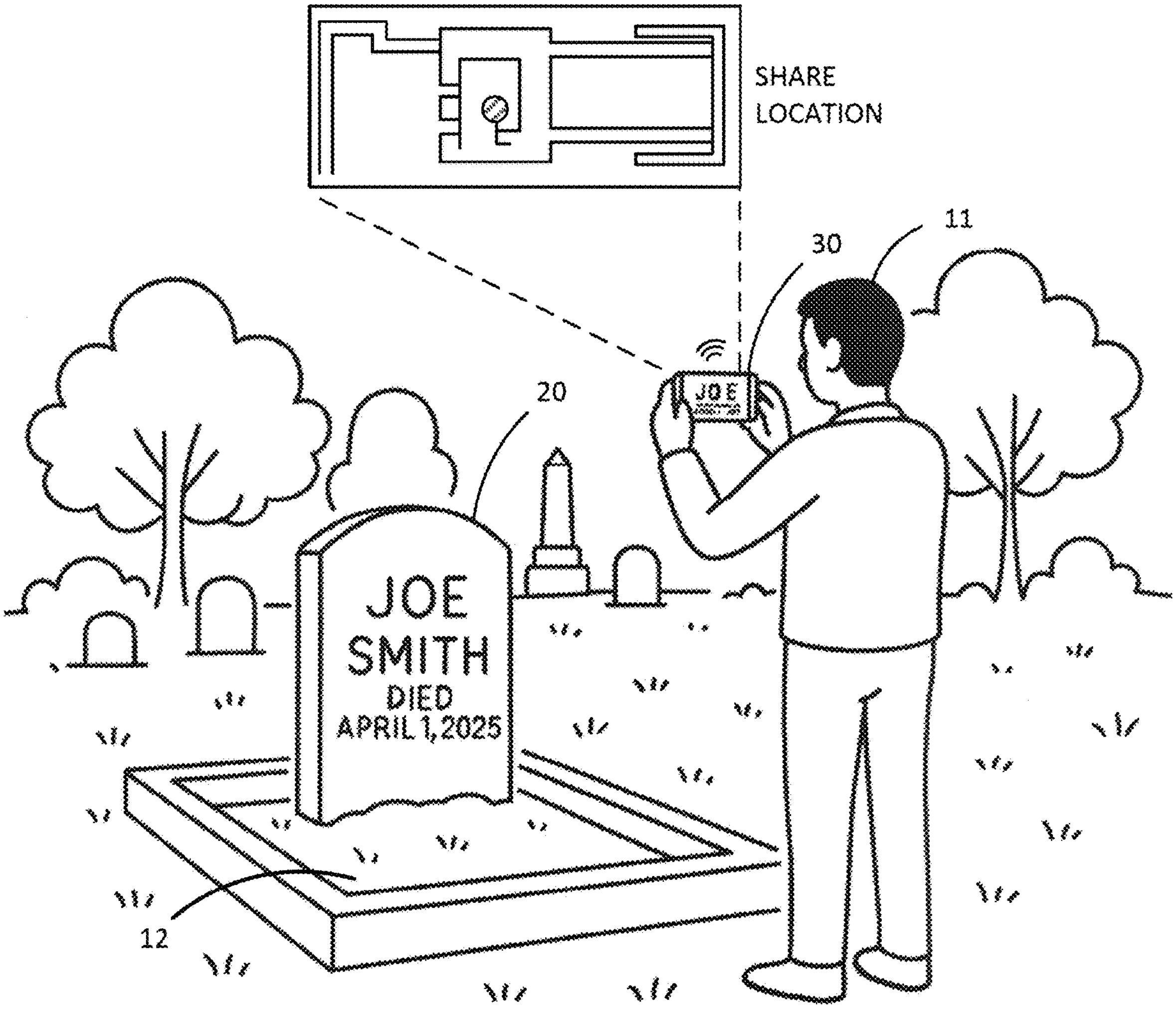
FIG. 5A is a schematic illustration of a man at a gravesite using his mobile phone to share his location, in accordance with one embodiment.
Figure 5B:
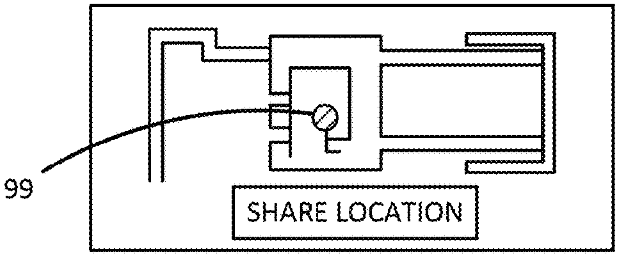
FIG. 5B is a schematic illustration of a prompt on the mobile pone of the man in FIG. 5A, in accordance with one embodiment.
Figure 6:
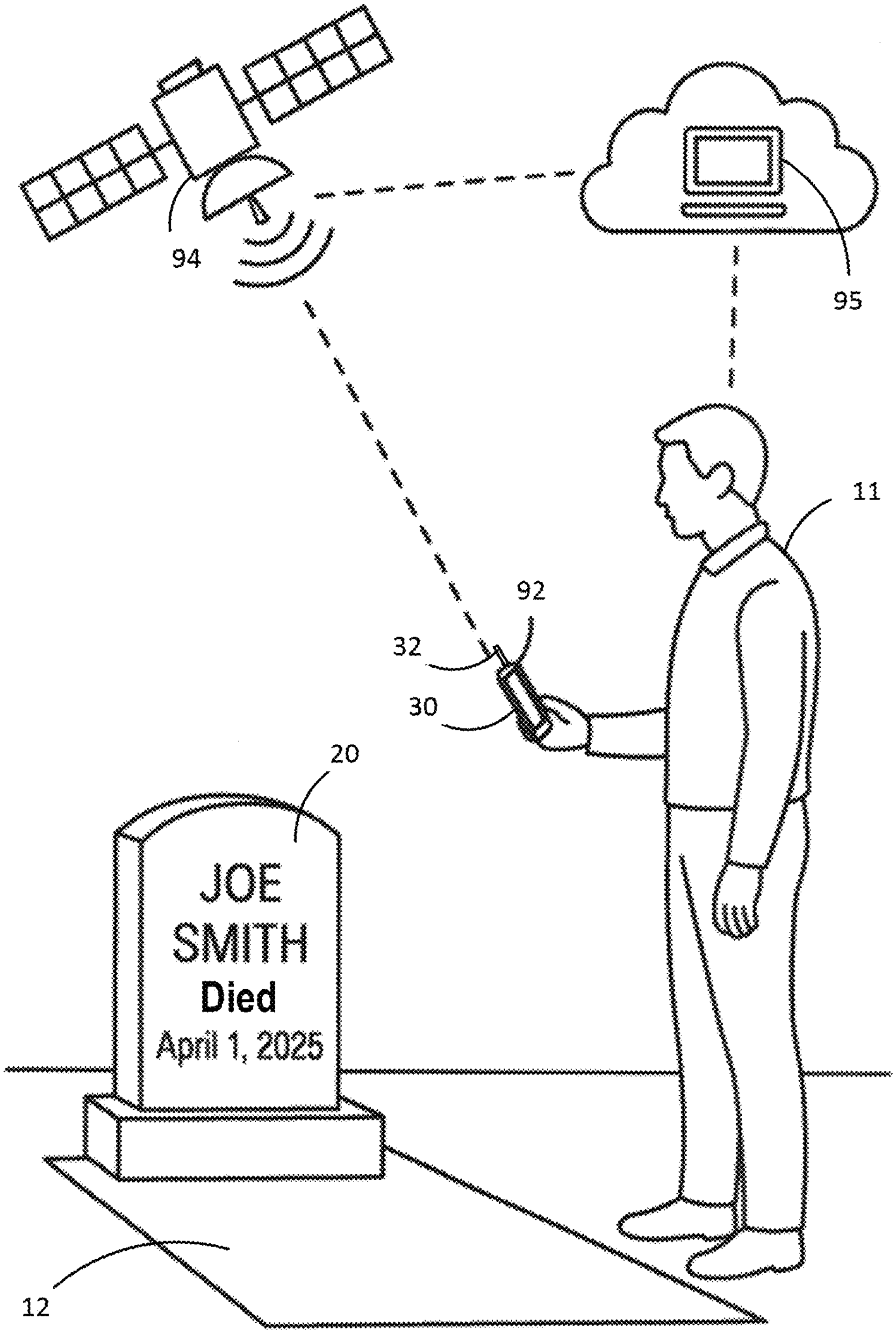
FIG. 6 is a schematic illustration having his location determined by a GPS system, in accordance with one embodiment.

One embodiment is a system 10 configured to incentivize specific soul-elevating prayers for a deceased at a gravesite of the deceased, comprising a server computer 95 having a memory 96 storing a set of instructions by the deceased—or payout rules derived from the set of instructions—for distributing portions of a fund of the deceased's money, and specifying which persons and/or category of persons will receive a preselected payment for reciting a preselected recitation at the gravesite and storing a database associating deceased individuals with alphanumeric content appearing on a surface of a monument of the gravesite, a mobile device 30 including an application that when opened verifies the client's presence at the gravesite of a particular deceased by any one or more of the following methods:

(i) digitally reading an alphanumeric content on the monument and determine if the content matches a content entry in the database of the deceased (ii) as shown in FIG. 2, taking a photo of the monument and compare to the photo in the database (iii) as shown in FIG. 4A (the rear of a monument 20) taking a scan of a QR code on the monument, the QR code linking to a screen that indicates verification, (iv) as shown in FIG. 5A and FIG. 5B, sending a "share location" message or other global positioning system or other positioning system message to the server computer 95 that (the pinpoint location is the circle 99 in FIG. 5B and the routes around that circle refer to the passageways in the cemetery or adjacent the cemetery)

(v) send a short range communication to a prepositioned microchip 50 (FIG. 4B) that is either embedded in the soil of the gravesite, embedded in a station standing near the gravesite or embedded in the monument, the message also sent to the computer server by either the microchip transmitter or by the application computer wherein the server computer 95 upon verification of the location of the client, checks what category of persons the client is a member of and presents to the client the preselected recitation, wherein the mobile device 30 (application) verifies that the client recited the preselected recitation either by generating an audiovisual recording of the recitation and sending to the computer server for verification or by performing on-site verification using recognition software (such as voice and/or visual or facial or lip movement recognition software) that compares to previously stored voice and/or lip samples of the client wherein upon verification of the recitation at the gravesite, the application or a standalone tablet computer station at the gravesite outputs for the client the preselected amount of an electronic payment or a confirmation of the electronic payment.

The set of instructions specifies which persons and/or which category of persons will receive payment from the fund across multiple generations and in what amount, in exchange for reciting the recitation at the gravesite and specifies a time frame for the recitation. The set of instructions may state under what conditions the client/person shall receive the payment in exchange for the recitation.

In one implementation shown in FIG. 11A, the payment module (not visible) including the LCD screen (not visible) embedded into the monument 20 is concealed by doors 91 that together represent a shape of a candle. The "candle" has a flame 92 above it to mesh with the environment of the cemetery. Alternatively a raised image of a candle 91 may be used or a structure shaped like a candle and having for example luminescence like a candle may be visibly embedded on either the monument 20, or on the post 90 for example standing on the soil or on or adjacent to a device attached to the post (such as a computer or tablet) or anywhere in the close vicinity of the gravesite. The purpose of this candle or similar structure is to conceal the incorporation of the electronics embedded in the gravestone or in the nearby post or nearby infrastructure so as to blend in with the cemetery environment and so as to not disturb the visual appearance of the cemetery or grave plot 12 or monument 20.

In FIG. 11B the doors 91 are ajar/open and accordingly, the payment module and in particular the LCD screen 86 is visible.

In FIG. 12A, a gravesite object 83 comprising a computer station. The computer station includes a computer 80 sitting on a base 82. The base 82 is configured to also function as a payment module 82 since it has an output slot for issuing payment receipts or confirmations.

The recitation required or requested by the deceased in any embodiment herein may be for example the Jewish mourner's prayer called Kaddish (FIG. 1, FIG. 8, FIG. 12A), one or more chapters of the biblical book of Psalms (FIG. 12B). In some embodiments, the deceased has requested that the client choose th recitation by choosing a blessing to be given to the deceased (orally) from all kinds of blessings, for example consistent with the religious seibilities of the deceased. Another example of a recitation that the deceased may choose is to have a short story about the deceased's life told or shown, for example to tell stories of heroism of the deceased from the past. This is performed in exchange for money.

Figure 19:
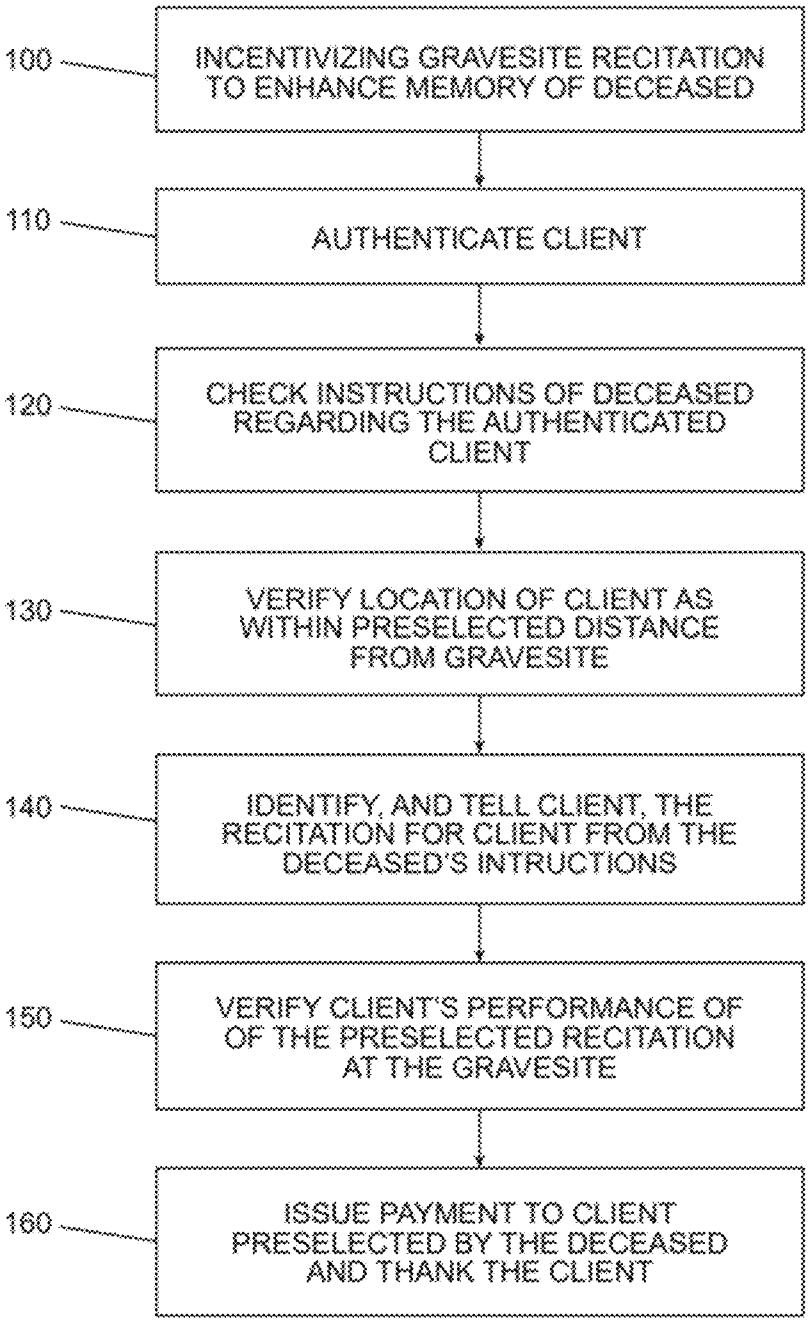
FIG. 19 is a flow chart showing a method, in accordance with one embodiment.

As shown in FIG. 19, another embodiment is a method 100 of incentivizing gravesite recitations for a deceased. One step of method 100 involves authenticating a client, who may be a relative of the deceased. The client enters a password and user name either on an application on the client's mobile phone 30 or on a dedication tablet or other computer at the gravesite.

Another step 120 comprises a system computer located, for example one located in cyberspace or anywhere remote from the gravesite, or alternatively a dedicated computer or table computer at the gravesite or near it, checking the database of deceased individuals and their associated instructions. The system computer checks the database that stores the instructions of various deceased individuals to find the instructions for the particular deceased buried at a particular gravesite being visited by a particular client. In particular, the computer checks what the instructions were given by the deceased are for that particular client. For example, the computer may check what category of persons the particular client is in. The categories of persons may include immediate family, close relatives, distant relatives, close friends, etc. While this depends on the instructions of the deceased, which could vary widely, in one example the deceased may have instructed that close family members whose recite a particular recitation at the gravesite receive a particular payment and others received a different payment.

The computer also may check what recitation (preselected by the deceased) has been selected by the deceased for that person/client or category of persons to recite at the gravesite and also what is the payment associated with it.

In a further step 130 (which could precede step 120), the location of the client is verified to confirm that the client is at the grave site. This can be performed in a number of ways including:

In a step 140 (which could be implemented out of order, for example it could precede step 130) the system computer notifies the client (or reminds the client) what recitation the client is supposed to recite at the gravesite, based on the instructions of the deceased.

In step 150, the client's performance of the recitation at the gravesite is verified in one of a number of ways including:

Another step of method 100 may comprise issuing a payment or a confirmation of payment to the client electronically. In one implementation, the application on the client's mobile device executes a transfer, for example by Bit, Paybox, Zelle, etc., and/or presents a confirmation of an electronic payment having been made. This may occur after the application verifies the recitation or after the system computer notifies the application that the recitation was verified. This step may also involve thanking the client for the performance of the recitation, as in FIG. 8, FIG. 9, FIG. 10, FIG. 11B, FIG. 12A. The funds used to pay client 11 in any of the methods herein (100, 200, 300) are from the fund of the deceased that the deceased set up (or directed others to set up) using the deceased's own assets.

Figure 20:
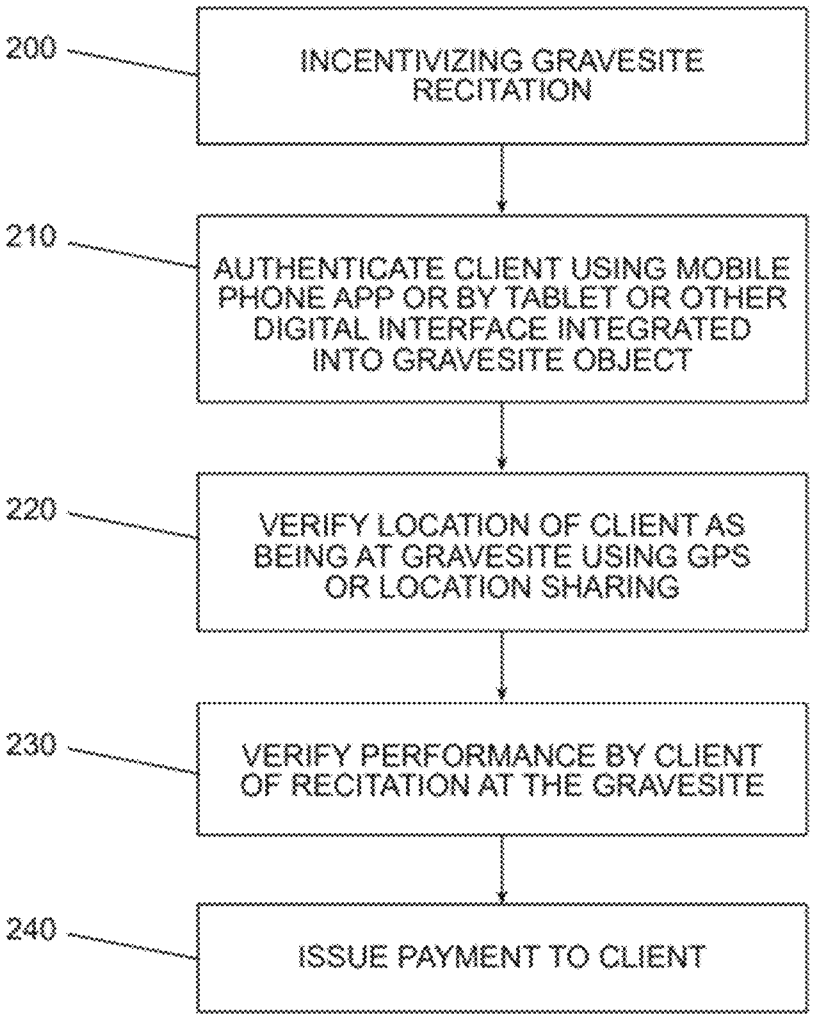
FIG. 20 is a flow chart of a further method, in accordance with one embodiment.

As shown in FIG. 20 another embodiment is a method 200 of incentivizing gravesite recitations for a deceased. Method step 210 comprises authenticating the client using a mobile communication device (30, 430) or using a tablet computer or using a computer that controls (using programming instructions stored on a memory and executed by the computer) a digital interface, such as an LCD or other type of digital interface that is integrated into any of the gravesite objects shown in the figures or mentioned herein with respect to system 10 or methods 100, 200, 300 or apparatus 400.

Method step 220 may comprise verifying the location of the client so as to confirm the client's location at the gravesite. This may be implemented by using a mobile communication device 430 of client 11 (or of a nearby individual) containing application 430. For example, step 220 may be implemented using GPS positioning system or other positioning system or by use of "location sharing" on device 430 or via a short range communication between the client's mobile device and a QR code 40 (FIG. 4A) or a microchip 50 (FIG. 4B) embedded into a gravesite object (for example embedded into the rear of the monument 20 or another gravesite object such as a bench 421, a console, a computer station 483, a pole 490, a stand, an ATM machine 488 or modified ATM machine or any other gravesite object affixed (i.e. an object affixed to the gravesite) such as a kiosk (not shown), or using the mobile device (30, 430) to take a photo or a scan of the content written or engraved on the monument and transmitting that content to a remote computer 95 for comparison (or by comparison with a database downloaded as part of the application that is then stored on the mobile device (30, 430). The term "application" 435 as used in apparatus 400 refers to all of the versions of the piece of software that bundles together several features discussed with respect to the application 35 on device 30 of system 10).

Method step 230 may comprise verifying that client 11 performed the recitation at the gravesite, as required by the deceased's set of instructions (a shortened version of which may comprise payout rules stored in application 435). The verification may be implemented by a mobile device 430 generating an audiovisual recording or visual recording of the client 11 performing the recitation and either (a) sending this recording to remote computer 95 for confirmation that it complies with the required recitation of the deceased for that individual (or for that category of individuals that the client 11 is a member of), or alternatively (b) having the application 435 itself compare the data of the audiovisual recording to downloaded data about the client (for example the client's voice, the client's facial features and/or lip movements from voice samples or otherwise) to yield a verification (or a rejection).

Method step 240 comprises issuing a payment or a confirmation of payment to client 11, for example at the gravesite electronically using application 435. This may also be implemented without application 435 by means of an ATM machine 88 or modified ATM machine 488 (or a payout module 482) on or embedded into or incorporated into a gravesite object, that may output a confirmation of an electronic payment, or in other instances may output actual cash 489.

Figure 21:
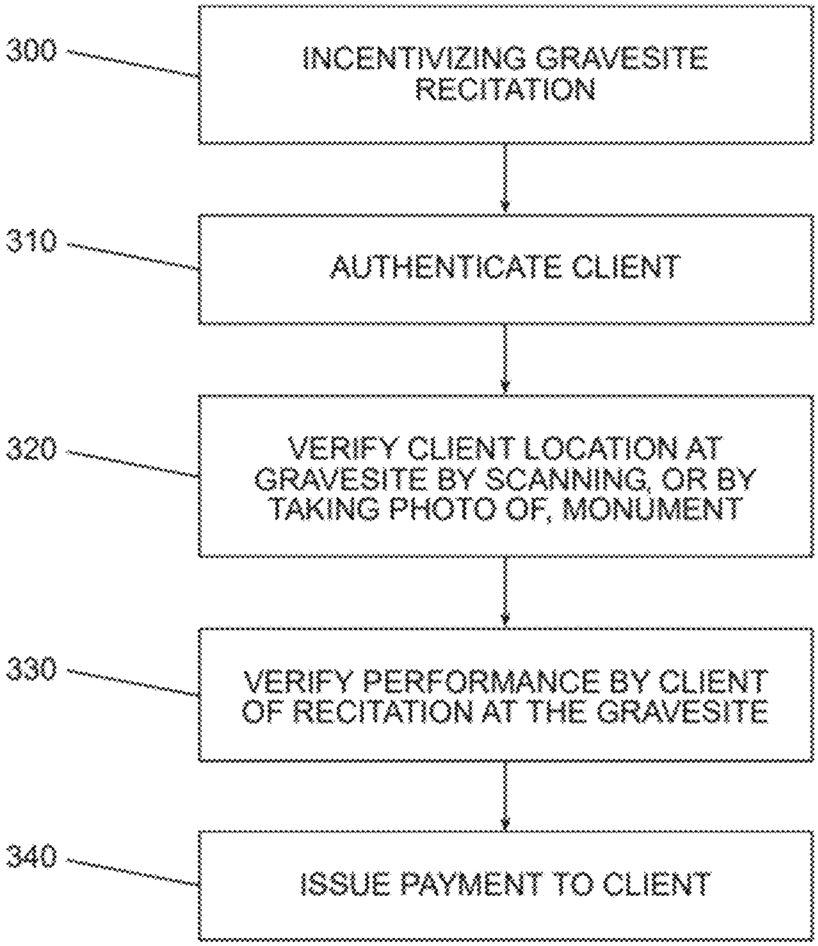
FIG. 21 is a flow chart showing a still further method, in accordance with one embodiment.

Another embodiment, as shown by FIG. 21, is a method 300 of incentivizing a recitation by a client 11 at the gravesite of the deceased, in accordance with the deceased's set of instructions. Method step 310 comprises authenticating the client 11. This may be on application 430 or on a digital interface including a screen 486 embedded into or on a gravesite object (any object affixed to the gravesite such as for example gravesite objects 12, 12A, 20, 21, 22, 70, 80, 83, 90 or gravesite objects 420, 421, 422, 480, 490).

Method step 320 may comprise verifying the location of the client 11, so as to confirm the client's location at the gravesite, by scanning or by taking a photo of the monument 20 using a mobile communication device 430 of client 11 (or of a nearby individual) containing application 430.

Method step 330 may comprise verifying the performance by client 11 of the recitation as required by the set of instructions of the deceased stored in remote computer 95 and/or on application 435. The particular implementations are the same as those mentioned for step 230 of method 200.

Method step 340 comprises issuing payment to client 11 in any of the implementations discussed with respect to step 240 of method 200.

Any of methods 100, 200, 300, 500, these methods may incorporate having the set of instructions specify which persons and/or which category of persons will receive payment from the fund across multiple generations and in what amount, in exchange for reciting the recitation at the gravesite and specifies a time frame for the recitation and/or under what conditions the client/person shall receive the payment in exchange for the recitation.

In any of methods 100, 200, 300, 500, the gravesite object may include one or more of a computer, a tablet computer and/or a smart communication device and programming instructions and memory configured to executed by a processor, the computer station.

In any of methods 100, 200, 300, 500, the recitation may be anything suitable to elevate the soul of the deceased such as a memorial prayer said for deceased persons of the Jewish faith/people/religion called Kaddish, a chapter of the biblical book of Psalms or other portions of the Bible, a story highlighting the good deeds of the deceased and/or the good character of the deceased, stories about the deceased and his or he family etc.

In any of the methods 100, 200, 300, 500, there may be a step of a mobile gravesite object such as a mobile device 30, 430 or a mobile tablet computer 37, 437 having a digital interface 86, 486 that is configured by the processing unit in the device to prompt or ask the client 11 whether they want to make a charitable donation to the deceased's fund. Alternatively, at the initiative of the client 11, the digital interface 86, 486 will have an option to make a charitable donation to the deceased's fund. To effectuate this the device 30, 430, 37, 437 or other gravesite object may have executable programmable instructions to perform this function (to contribute funds to the fund of the deceased).

In any of methods 100, 200, 300, 500, a gravesite object or a mobile gravesite object may have a computer or processing unit that includes executable programmable instructions, that when executed by such processing unit, takes a video of the user reciting the prayers at the gravesite and stores the video for access by future users who are visitors to the gravesite.

In any of methods 100, 200, 300, 500, a gravesite object or a mobile gravesite object may have a computer or processing unit that includes executable programmable instructions, that when executed by such processing unit, uses the LCD screen or other digital interface to authenticate the user, by requiring the user to enter user name and password and may require presentation of a picture ID that it then checks such as a government issued ID.

In any of methods 100, 200, 300, 500, the set of instructions may also specify which persons (clients) and/or which category of persons (clients) will receive a preselected payment for reciting the preselected recitation at the gravesite, wherein the preselected recitation is associated with that person or a category of persons that this particular person (client) is a member of.

In any of the methods 100, 200, 300, 500, there may be steps that the components of system 10 or apparatus 400 are configured to carry out as described herein.

Any version of the components of either system 10 or apparatus 400 needed to implement any of the methods herein (100, 200, 300, 500) or any such component that has been mentioned in this patent application may be used in such method (100, 200, 300, 500).

As shown in FIG. 13 through FIG. 18, another embodiment is a gravesite payout apparatus 400 located at a gravesite for enhancing a memory of a deceased.

The apparatus 400 may comprise a gravesite object 410 (i.e. an object located at the gravesite) or a mobile gravesite object held by the user (such as a mobile communication device 430, 437 at the gravesite). In one implementation, the gravesite object may be resting (i) on a ground of the gravesite, (ii) on a second gravesite object that rests on a ground of the gravesite or that rests on a floor offset from the ground of the gravesite, (iii) on the floor offset from the ground of the gravesite. The example of a floor offset from the ground of the gravesite is intended to encompass gravesites that are above ground, for example sites in a cave or cave-like location.

As shown in FIG. 13 through FIG. 18, the gravesite object comprises one or more of: a monument 420 (FIG. 1 through FIG. 12C), a bench 421 (FIG. 12C), a chair/seat 423, a table, a pole 440 (FIG. 12B), a computer station 483 (FIG. 12A) or any other object fixed to the gravesite or a mobile device (such as a computer, a mobile tablet computer, a laptop computer, a desktop computer, an e-reader, a mobile smartphone, a smart-TV or a smartwatch) held by a client at the gravesite since such a mobile device has a processing unit. The gravesite object is a monument 420 in some embodiments. In some embodiments, the gravesite object comprises a post 490 or a holder embedded into a ground of the gravesite. These are just non-limiting examples and it is understood that the gravesite object is any object affixed to the gravesite.

The apparatus 400 may also comprise a payment module 482, including a computer system, that include a digital interface 486 and a processing unit 480 configured to control the digital interface 486 such that payments, voucher payments and confirmation of payments are output in accordance with a set of payout rules consistent with a set of instructions of the deceased. The payment module 482 may be integrally attached to, embedded into or situated within the gravesite object 410.

The payment module 482 may comprise an ATM machine, and in some embodiments a modified ATM machine 488 that has programmable instructions to issue payments (for example programming instructions stored on a memory and executed by the processing unit or computer of the ATM computer to issue payments or send transmissions to payment conduits or financial institutions to effectuate a wire transfer and to control the digital interface 486 so as to prompt the client to input bank wiring instructions if the system's remote computer 95 does not already have such information). As such, the digital interface 486, which may include a digital screen 486 such as an LCD screen 486 controlled by the computer 480 or processing unit, may be configured to notify a user that a payment was made to the user (for example electronically), or to actually issue a payment or a confirmation of payment or a voucher (that can be used to obtain a payment by the client later, for example from the system computer 95 or web site) to the user. The payment module 482 may also comprise a printer (not shown) controlled by the computer 480. Computer 480 (or another computer) may include a memory that stores a set of payout rules consistent with instructions of the deceased buried at the gravesite, and includes a digital interface. The payment module 482 may also comprise another physical mechanism for dispensing a payment or a confirmation of payment to a client 11 at the gravesite.

Figure 17A:
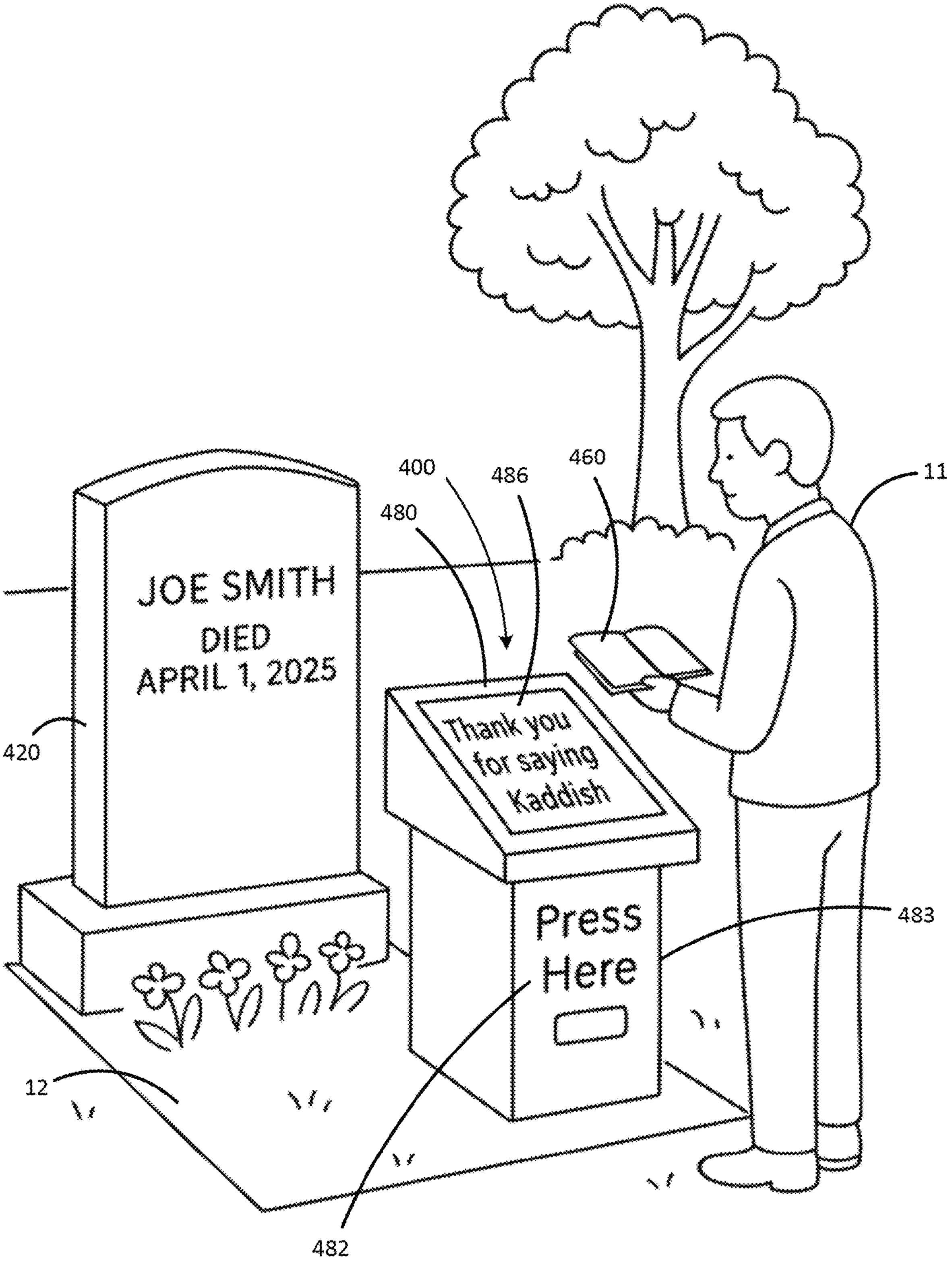
FIG. 17A is a gravesite payout apparatus similar to FIG. 12A, in accordance with one embodiment.
Figure 17B:
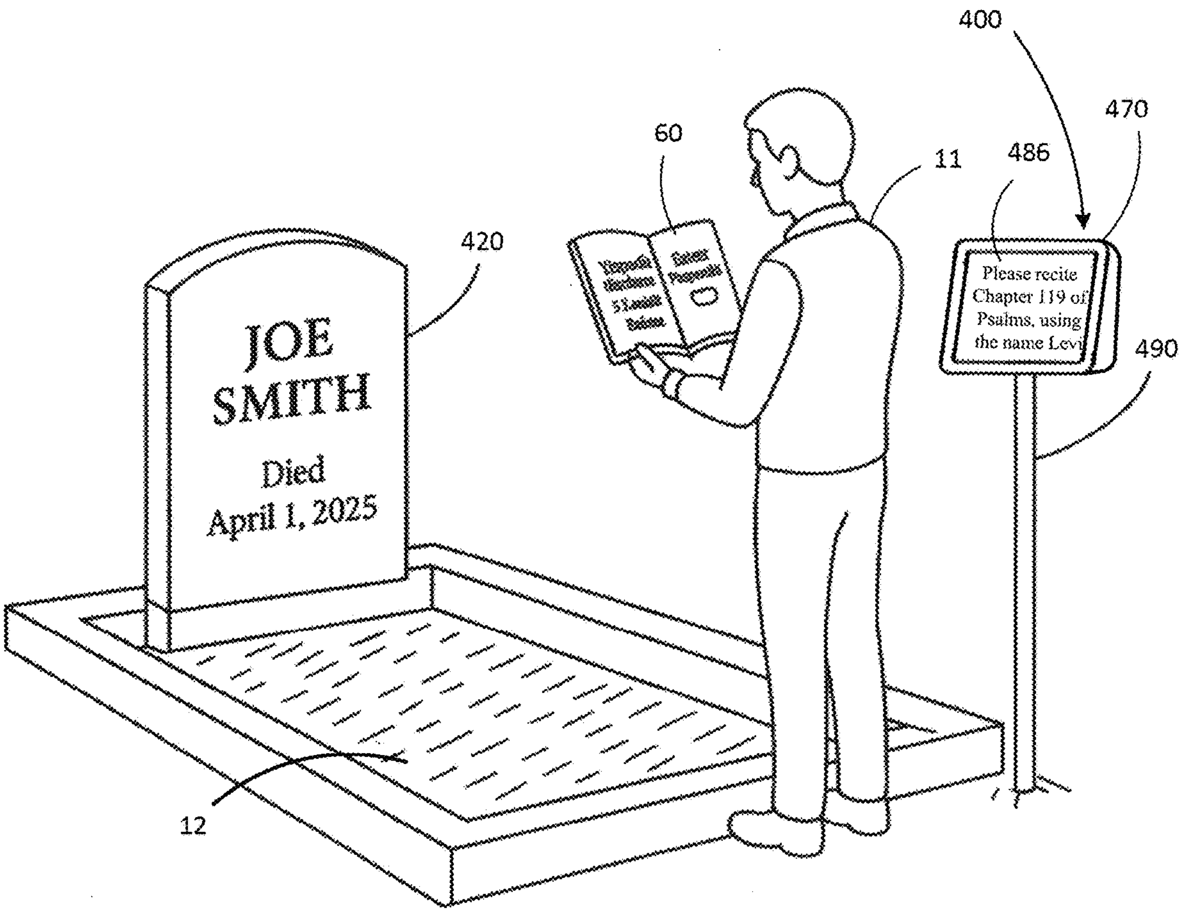
FIG. 17B is a gravesite payout apparatus similar to FIG. 12B, in accordance with one embodiment.
Figure 17C:
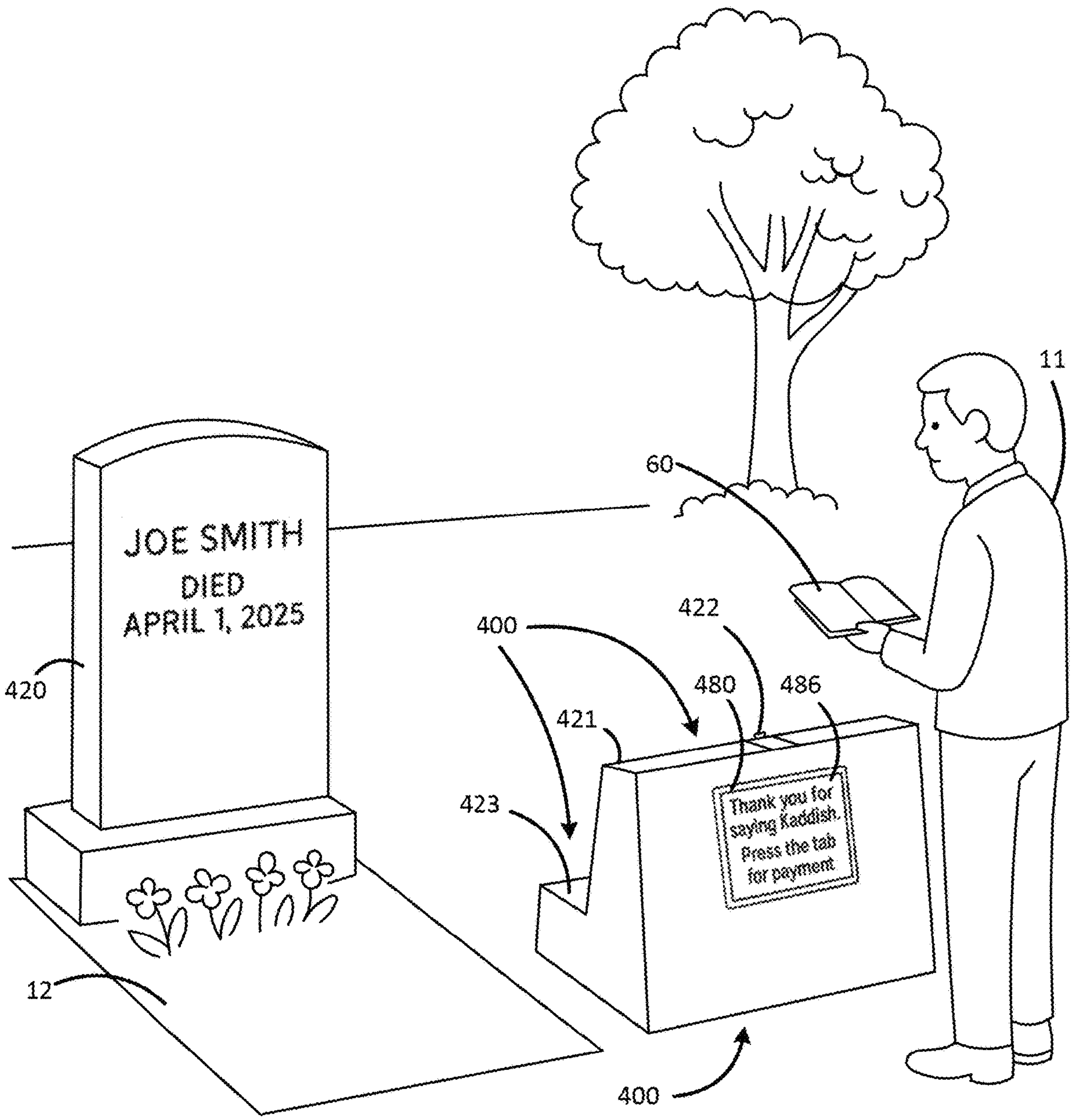
FIG. 17C is a gravesite payout apparatus similar to FIG. 12C, in accordance with one embodiment.
Figure 17D:
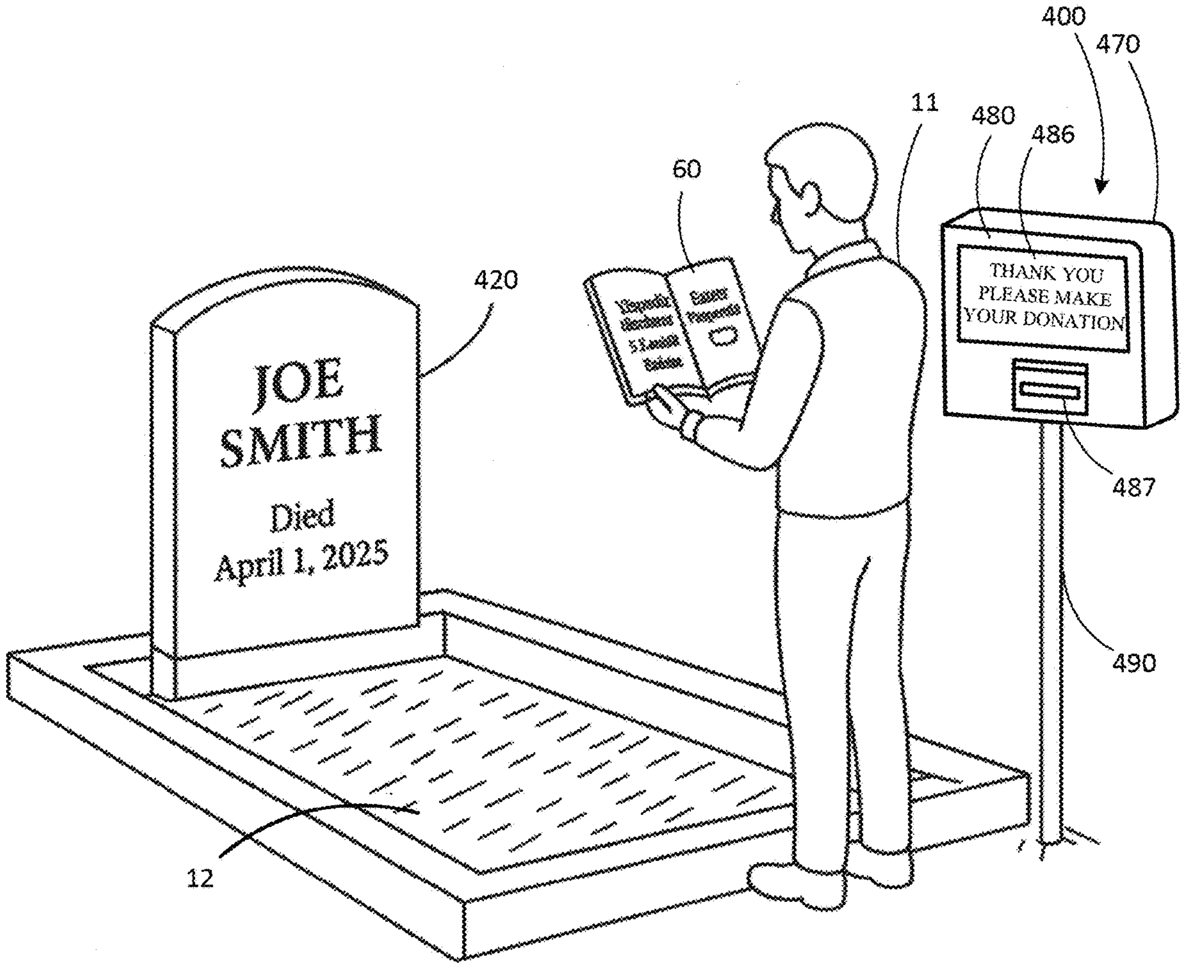
FIG. 17D is a gravesite payout apparatus similar to FIG. 12D, in accordance with one embodiment.
Figure 17E:
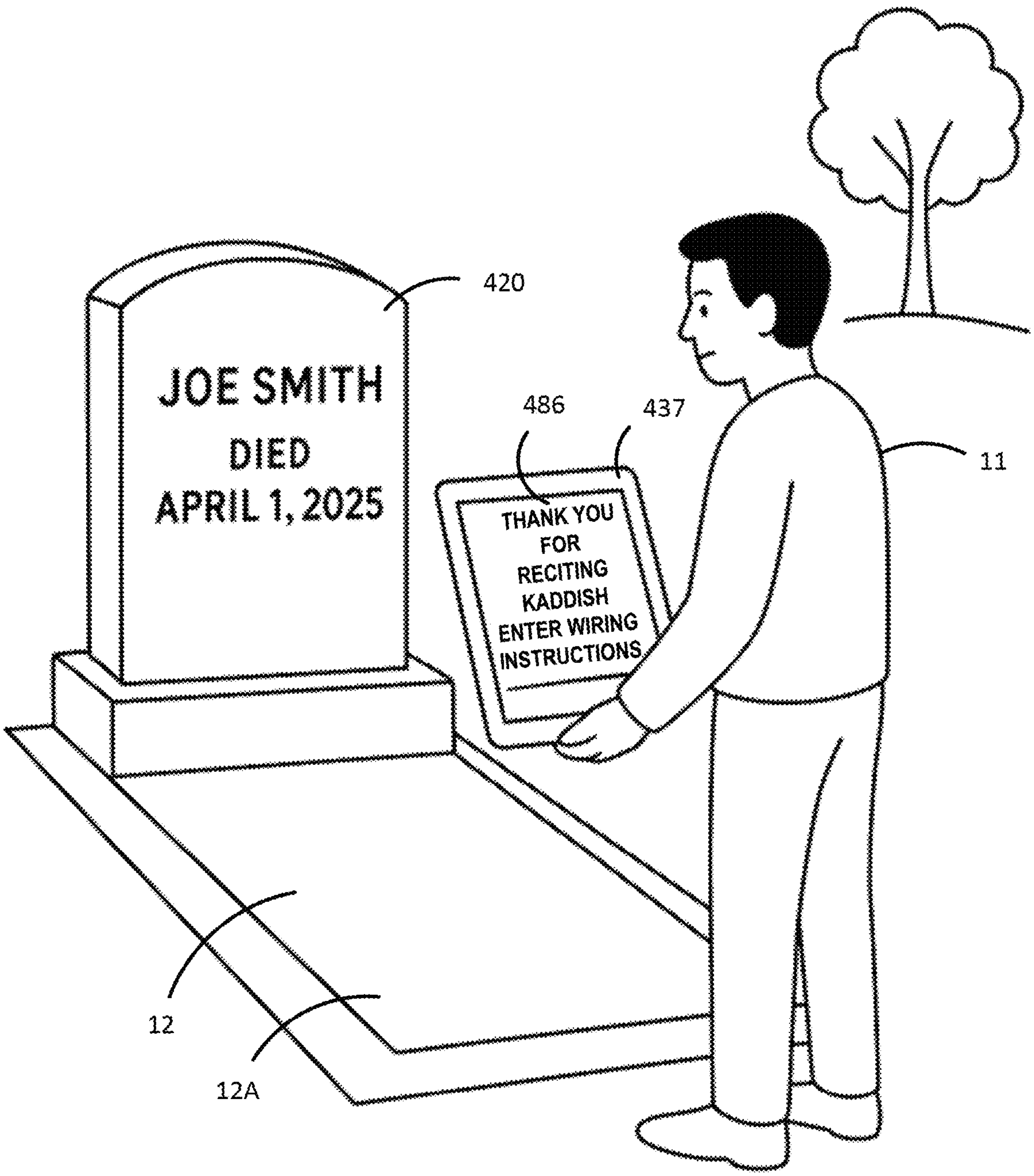
FIG. 17E is a gravesite payout apparatus similar to FIG. 12E, in accordance with one embodiment.
Figure 18:
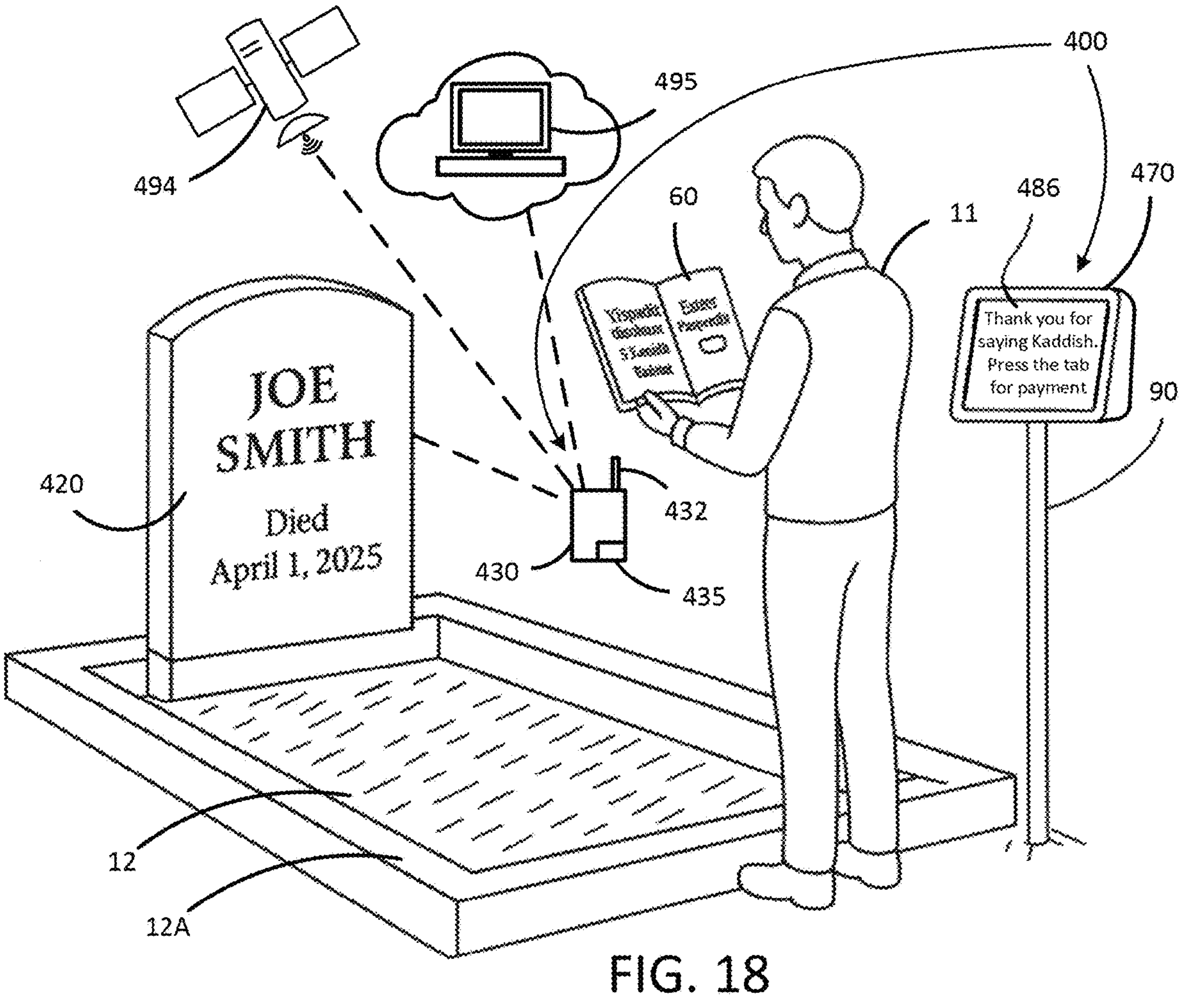
FIG. 18 is a gravesite payout apparatus similar to FIG. 1, in accordance with one embodiment.

As shown in FIG. 17E, the client 11 may hold a mobile tablet computer 37 after the client 11 performed the recitation required by the deceased's set of instructions (or payout rules derived therefrom) or the client may hold a mobile communication device 430 (FIG. 18). The LCD screen 486 of tablet computer 37 may prompt the user to provide wiring details to facilitate a payment to the client. For example, as shown in FIG. 17E, the LCD screen or other digital interface may state something like the following: states "Thank you for reciting Kaddish. Please Enter Wiring Instructions". The mobile tablet computer 437 may also issue a digital confirmation of payment.

In another version shown in FIG. 17A, the gravesite payout apparatus 400 (at a gravesite for enhancing a memory of a deceased) comprises a gravesite object in the form of a computer station 483 having a base and a computer system 480 that may incorporate a modified ATM machine 482 (FIG. 15, FIG. 17A) that has been modified to have programming instructions stored on a memory and executed by the computer to issue payments or send transmissions to payment conduits or financial institutions to effectuate a wire transfer and to control the digital interface to prompt the client to input bank wiring instructions, if the system's remote computer 95 does not already have such information, and whose digital user interface 486 is configured to notify a user that a payment was made to the user or to notify the client/user that the ATM is issuing a payment (for example by or a confirmation of payment or a voucher (for later payment) to the user, which can be taken by the client/user from a particular slot or window or opening. The computer 480 of the computer station 483 may include programming instructions (not shown) and a memory (not shown) that stores the set of payout rules that are consistent with deceased's set of instructions. The deceased referred to is the deceased buried at the gravesite that the gravesite object is located at.

Figure 16A:
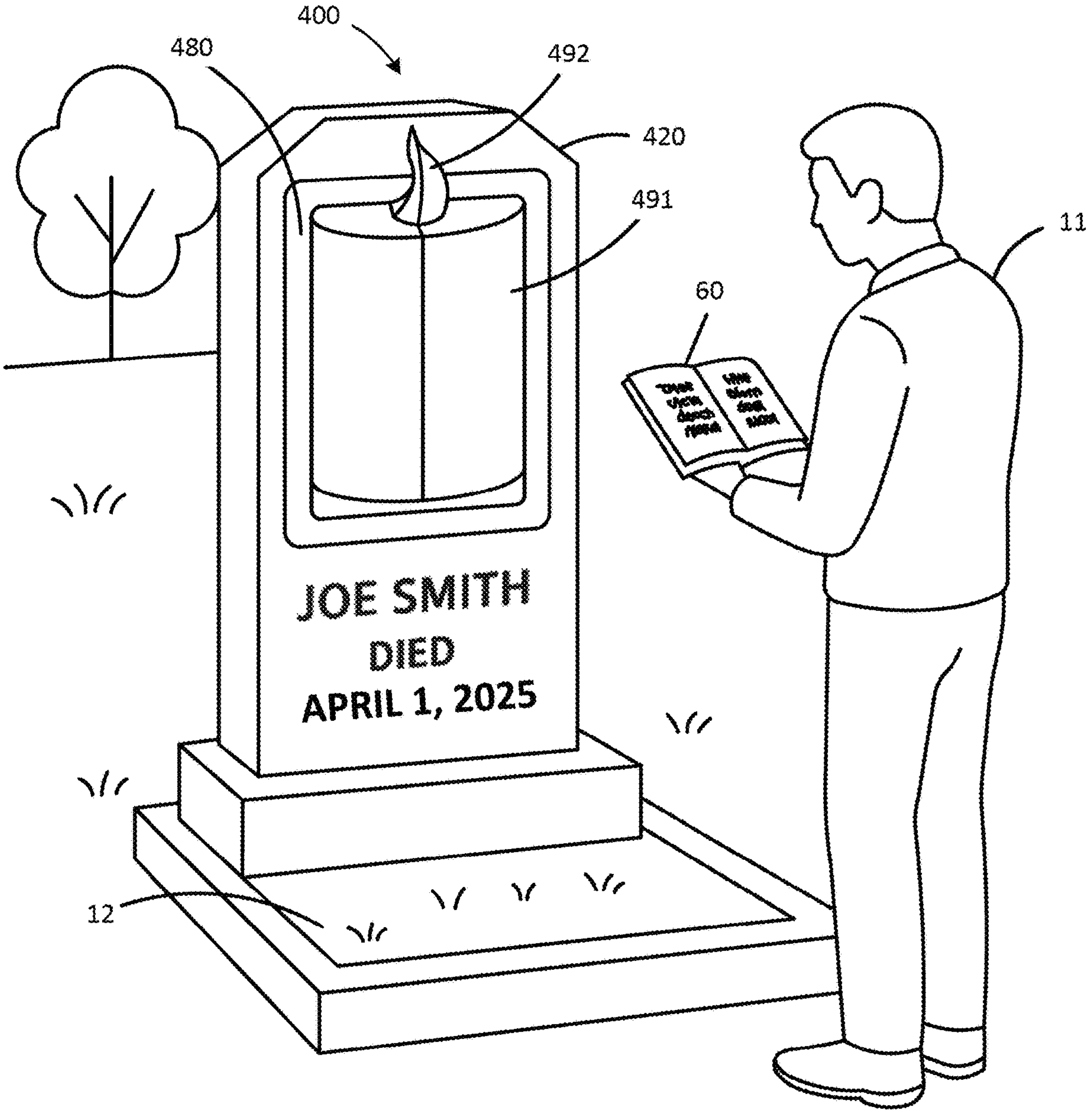
FIG. 16A is a gravesite payout apparatus similar to FIG. 11A, in accordance with one embodiment.
Figure 16B:
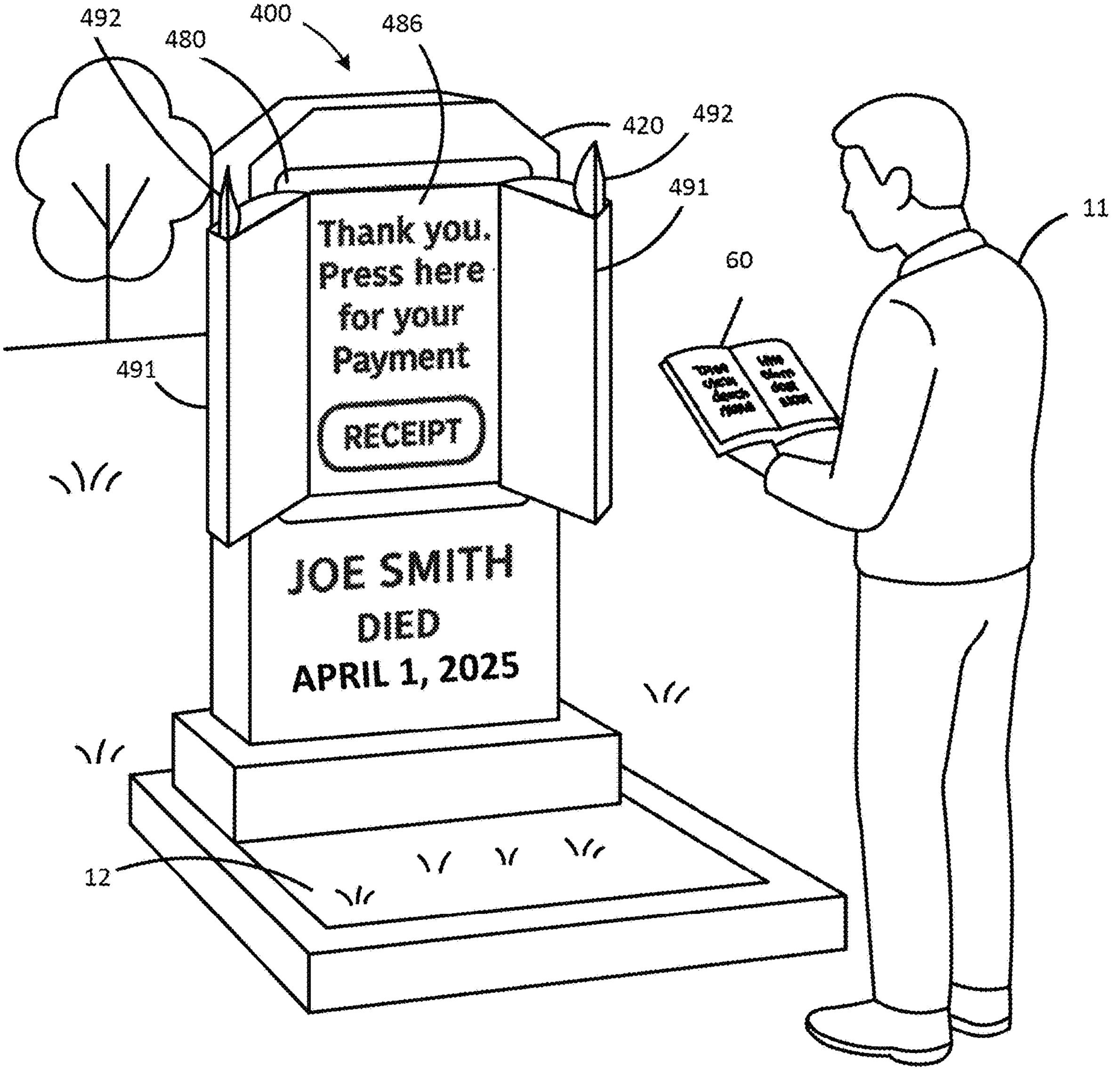
FIG. 16B is a gravesite payout apparatus similar to FIG. 11B, in accordance with one embodiment.

For either version of the gravesite payout apparatus, in some embodiments, as shown in FIG. 16A and FIG. 16B, the digital interface 486 may have a movable cover 491, such as doors 491. FIG. 16A depicts the digital interface 486 covered in a first position and FIG. 16B depicts the digital interface 486 uncovered in a second position. The purpose of the cover 491 is to allow the gravesite object to fit in with the surroundings of the cemetery environment. As shown in FIG. 16A and in FIG. 16B, the external cover 491 of the digital interface 486 in the first position has an appearance of a candle 492 or a flame 492. This is also for blending in with the environment of a memorial.

The apparatus 400 may also include a device such as a dedicated computer 480, a mobile tablet computer 437, a dedicated tablet computer 470, a laptop computer, a desktop computer, an e-reader, a mobile smartphone 430, a smart-TV or a smartwatch or a camera 422 located at the gravesite. The computer, the tablet computer, the laptop computer, the desktop computer, the e-reader, the mobile smartphone, the smart-TV or the smartwatch or camera may, in some embodiments, be separate from the gravesite object 410 and the computer system 480 and may be integrated into a second gravesite object (not shown).

Any of these devices 480, 437, 470, 430, etc. may be configured to, or configurable to, verify that, or receive a communication that, a recitation has been performed by the user at the gravesite. Any of these devices 480, 437, 470, 430, etc. may be configured to, or configurable to, generate a recording of a recitation performed by the user. For example, client 11 at the gravesite may perform the recitation in front of a standalone camera 422 embedded into a gravesite object or in front of camera that is part of a device (for example a computer, a mobile tablet computer, a laptop computer, a desktop computer, an e-reader, a mobile smartphone, a smart-TV or a smartwatch incorporating the camera) and the device is incorporated into a gravesite object.

In apparatus 400, any of these devices (for example computer 95 and/or mobile device 430 (and the application 435 stored thereon) and/or a dedicated computer 480, and/or dedicated tablet computer 470, and/or mobile tablet computer 437, and/or camera 422 in a gravesite object or a mobile gravesite device located at the gravesite) may be configured to verify the location of the client 11 to confirm that client 11 is at the gravesite. This may occur in a number of ways by any of these devices, including but not limited to the device:

i) reading an alphanumeric content on a gravesite object such as the monument and determine if the content matches a content entry in the database of the deceased
(ii) taking a photo of the monument and compare to the photo in the database
(iii) take a scan of a QR code on the monument, the QR code linking to a screen that indicates verification,
(iv) sending a "share location" message or other positioning system message to the remote computer
(v) send a short range communication to a prepositioned microchip that is either embedded in the soil of the gravesite, embedded in a station standing near the gravesite or embedded in the monument, the message also sent to the computer server by either the microchip transmitter or by the application computer.

In some embodiments, the computer system 480 is configured to issue the payment or notify the user that the payment was made, once the payment module 480 has been able to verify that, or a receives a communication of a fact that, a recitation has been performed by the client/user at the gravesite.

The devices such a computer 480, a tablet computer, a laptop computer, a desktop computer, an e-reader, a mobile smartphone, a smart-TV or a smartwatch, located at the gravesite may be configured to, or be configurable to, verify that, or receive a communication that, the proper recitation (required by the deceased's set of instructions) has been performed by the user at the gravesite.

Any of the devices may have therein an application 435 stored. The application may be stored on one or more of the computer, the tablet computer, the laptop computer, the desktop computer, the e-reader, the mobile smartphone, the smart-TV or the smartwatch, for example on memory.

In some embodiments, apparatus 400 includes a camera, as shown in FIG. 12C.

The digital interface 486 of apparatus 400 may be covered in a first position and is uncovered in a second position (as shown in FIG. 11A-B in the context of system 10).

Memory 485 of computer system 480 may store a set of payout rules consistent with instructions of the deceased buried at the gravesite. The instructions determine how to distribute portions of the deceased's fund to particular persons or particular persons who fall into particular categories of persons, in exchange for the particular person's performance of a recitation at the gravesite.

In some embodiments, the computer system 480 may be configured to instruct the digital interface 486 to dispense cash.

As shown in FIG. 17D, in some embodiments, the housing for the computer 80 may also include a slot 487 (for example as part of an ATM machine or other charitable donation mechanism) configured, for example, to receive a payment in the form of an envelope or checks or cash or other form of payment that can be inserted by hand by a client/user at the gravesite. This represents a donation to the deceased's fund.

While the invention has been described with respect to a limited number of embodiments, it will be appreciated that many variations, modifications and other applications of the invention may be made. Therefore, the claimed invention, as recited in the claims that follow, is not limited to the embodiments described herein.

What is claimed is:

1. A gravesite payout apparatus located at a gravesite of a deceased, comprising:

a gravesite object resting on or embedded into (i) a ground of the gravesite, (ii) a second gravesite object that rests on or is embedded into a ground of the gravesite or that rests on or is embedded into a floor offset from the ground of the gravesite, (iii) the floor offset from the ground of the gravesite, a payment module, including a computer system, integrally attached to, embedded into or situated on or within the gravesite object, wherein the computer system includes a digital interface and a processing unit configured to control the digital interface such that any payments, voucher payments and confirmation of payments are output in accordance with a set of payout rules consistent with a set of instructions of the deceased, the payment module configured to: dispense a payment, a confirmation of payment or a payment voucher to the user through a mechanically or electronically actuated dispensing mechanism forming part of the payment module at the gravesite, wherein the computer system is configured to verify using recognition software that the user has recited a preselected recitation at the gravesite, the verification including generating a digital recording of at least part of the recitation by the user at the gravesite and comparing the digital recording to previously stored sample data of the user, the sample data being held on-site or in the remote computer, the verification utilizing the recognition software at least for the comparing, wherein the issuance of the payment, the confirmation of payment or the payment voucher by the payment module is conditional upon successful verification.

2. The gravesite payout apparatus of claim 1, wherein the computer system is configured to issue the payment voucher, redeemable at a remote location through the mechanically or electronically actuated dispensing mechanism only upon successful verification of the user at the gravesite.

3. The gravesite payout apparatus of claim 1, wherein the digital interface has a movable cover such that the digital interface is covered in a first position and is uncovered in a second position.

4. The gravesite payout apparatus of claim 3, wherein the cover, in the first position, has an appearance of a candle or a flame to blend the digital interface into an environment of the cemetery.

5. The gravesite payout apparatus of claim 1, wherein the computer system is configured to verify the presence of the user at the gravesite and the performance of the preselected recitation using a camera in combination with the recognition software that compares the user's voice, facial features, or lip movements to previously stored sample data, the verification used to control issuance of the payment, confirmation of payment voucher or payment voucher.

6. The gravesite payout apparatus of claim 1, wherein the gravesite object includes one or more of: a monument, a chair, a bench, a table, a pole, a holder, a station, a base, a terminal, a kiosk.

7. The gravesite payout apparatus of claim 5, wherein the computer, the tablet computer, the laptop computer, the desktop computer, the e-reader, the mobile smartphone, the smart-TV or the smartwatch located at the gravesite is also configured to generate a recording of a recitation performed by the user.

8. The gravesite payout apparatus of claim 1, wherein the computer system is configured to actuate an electronic payment confirmation displayed or transmitted locally at the gravesite only upon successful verification of the user at the gravesite.

9. The gravesite payout apparatus of claim 1, wherein the presence of the user at the gravesite and performance of the preselected recitation is verified by generating an audiovisual recording of the user performing the recitation at the gravesite using the computer system or a mobile device held by the user at the gravesite, and transmitting the recording to a remote server for verification, wherein issuance of a payment, payment voucher, or confirmation is authorized only upon successful verification.

10. The gravesite payout apparatus of claim 1, wherein the gravesite object is a monument.

11. The gravesite payout apparatus of claim 1, further comprising an application stored on one or more of the computer, the tablet computer, the laptop computer, the desktop computer, the e-reader, the mobile smartphone, the smart-TV or the smartwatch.

12. The gravesite payout apparatus of claim 1, wherein the presence of the user at the gravesite and performance of the preselected recitation is verified locally at the gravesite using a camera and/or the recognition software on a mobile device held by the user at the gravesite, wherein issuance of a payment, payment voucher, or confirmation is authorized only upon successful verification.

13. The gravesite payout apparatus of claim 1, wherein the computer system is configured to output at least one of: cash, a tangible payment voucher, or an electronic payment confirmation, through a mechanically or electronically actuated output mechanism, only upon successful verification of the user at the gravesite, wherein the output is incapable of being issued without the detected on-site interaction.

14. The gravesite payout apparatus of claim 1, wherein the computer system is configured to instruct the digital interface to dispense cash through the mechanically actuated dispensing mechanism including an output slot, only upon successful verification of the user at the gravesite.

15. The gravesite payout apparatus of claim 1, wherein the verification utilizes one or more of a camera, short range communication module, QR code scanner module, a module configured to transmit or receive a token for verifying user identity, location sharing software, positioning system.

16. A gravesite payout apparatus located at a gravesite of a deceased, comprising a gravesite object resting on or embedded into (i) a ground of the gravesite, (ii) a second gravesite object that rests on or is embedded into a ground of the gravesite or that rests on or is embedded into a floor offset from the ground of the gravesite, (iii) the floor offset from the ground of the gravesite, a payment module, including a computer system, integrally attached to, embedded into or situated on or within the gravesite object, wherein the computer system includes a digital interface and a processing unit configured to control the digital interface such that any payments, voucher payments and confirmation of payments are output in accordance with a set of payout rules consistent with a set of instructions of the deceased, the digital interface configured to:

notify a user that a payment was made to the user, or issue a payment or a confirmation of payment or a payment voucher to the user, wherein the computer system or a remote computer is configured to verify using recognition software that the user has recited a preselected recitation at the gravesite, the verification including generating a digital recording of at least part of the recitation by the user at the gravesite and comparing the digital recording to previously stored sample data of the user, the sample data being held on-site or in the remote computer, the verification utilizing the recognition software at least for the comparing, wherein the issuance of the payment, the confirmation of payment or the payment voucher by the payment module is conditional upon successful verification.

17. The gravesite payout apparatus of claim 16, wherein the verification utilizes one or more of: a camera, short range communication module, QR code scanner module, a module configured to transmit or receive a token for verifying user identity, location sharing software, positioning system, attached to, embedded into or situated on the gravesite object.

18. The gravesite payout apparatus of claim 16, wherein a location-verifying optical code embedded is used to verify a location of the user at the gravesite.

19. The gravesite payout apparatus of claim 16, wherein the computer system is configured to actuate an electronic payment confirmation displayed or transmitted locally at the gravesite only upon successful verification of the user at the gravesite.

20. The gravesite payout apparatus of claim 16, wherein a presence of the user at the gravesite and performance of the preselected recitation is verified by generating an audiovisual recording of the user performing the recitation at the gravesite using the computer system or a mobile device held by the user at the gravesite, and transmitting the recording to a remote server for verification, wherein issuance of a payment, payment voucher, or confirmation is authorized only upon successful verification.

21. The gravesite payout apparatus of claim 1, wherein the payment voucher comprises an instrument redeemable for economic value at a local or remote location.

22. The gravesite payout apparatus of claim 16, wherein the payment voucher comprises an instrument redeemable for economic value at a local or remote location.

* * * * *